US012664837B2

(12) United States Patent
    Cornelius et al.

(10) Patent No.:    US 12,664,837 B2
(45) Date of Patent:        Jun. 23, 2026

(54) SHORE POWER CONNECTION ALERT SYSTEM FOR AN OVER-THE-ROAD VEHICLE

(71) Applicant: Tramec, L.L.C., Shawnee, KS (US)

(72) Inventors: Kevin Cornelius, Lees Summit, MO (US); Alec Michael Holm, Holland, MI (US); Chris Kline, Allendale, MI (US)

(73) Assignee: Tramec, L.L.C., Shawnee, KS (US)

( * ) Notice: Subject to any disclaimer, the term of this patent is extended or adjusted under 35 U.S.C. 154(b) by 62 days.

(21) Appl. No.: 18/750,895

(22) Filed: Jun. 21, 2024

(65) Prior Publication Data

US 2024/0428627 A1      Dec. 26, 2024

Related U.S. Application Data

(60) Provisional application No. 63/509,871, filed on Jun. 23, 2023.

(51) Int. Cl.
    *G07C 5/08*          (2006.01)
    *B60H 1/00*          (2006.01)
    *B60T 15/36*         (2006.01)
(52) U.S. Cl.
    CPC ....... *G07C 5/0833* (2013.01); *B60H 1/00264* (2013.01); *B60T 15/36* (2013.01); *G07C 5/0825* (2013.01)
(58) Field of Classification Search
    CPC ... B60H 1/00264; B60T 15/36; G07C 5/0825; G07C 5/0833
    See application file for complete search history.

(56) References Cited

U.S. PATENT DOCUMENTS

| | | | |
|---|---|---|---|
| 2020/0130645 A1 | 4/2020 | Srnec | |
| 2020/0141746 A1* | 5/2020 | Srnec | ................... B60H 1/3232 |
| 2020/0242855 A1* | 7/2020 | Sandu | .................... G16Y 40/10 |
| 2021/0285780 A1* | 9/2021 | Srnec | ................... B60H 1/3232 |

FOREIGN PATENT DOCUMENTS

| | | |
|---|---|---|
| EP | 3371013 A1 | 9/2018 |
| KR | 960022559 U | 7/1996 |
| KR | 19990034970 A | 5/1999 |

(Continued)

OTHER PUBLICATIONS

AccFormNMC StopOut(R) lockout tagout products; https://www.accuform.com/search/results/stopout/filterProductType/12/page/0; last accessed Sep. 4, 2024 Sep. 4, 2024.

(Continued)

*Primary Examiner* — Sisay Yacob

(74) *Attorney, Agent, or Firm* — McGarry Bair PC

(57)                ABSTRACT

A shore power alert system for an over-the-road (OTR) vehicle. The OTR vehicle has a cab, a cargo area, and parking brake system with a parking brake and a compressed air source. The OTR vehicle is coupled to a shore power connection. The shore power connection alert system has a first solenoid valve, a compressed air inlet line, a compressed air outlet line, and a transmission unit. The first solenoid valve has a fluid output line and a fluid input line. The compressed air inlet line is fluidly coupled to the compressed air source. The compressed air outlet line is fluidly coupled to the parking brake.

38 Claims, 12 Drawing Sheets

800

(56)       References Cited

FOREIGN PATENT DOCUMENTS

WO        2010002644  A1      1/2010

OTHER PUBLICATIONS

AME Commercial Lock Out Tag Out Kit; https://www.alltiresupply.
com/products/ame-commercial-lock-out-tag-out-kit? srsltid=AfmBO
ooHQXGEPZgdkNB3eUFAmm79hxpIWTMSkguTsaesy1ziol
ranaE _; last accessed Sep. 4, 2024 Sep. 4, 2024.
SafeConnect eTRU connection system; https://www.safeconnectsystems.
com/products/; last accessed Sep. 4, 2024 Sep. 4, 2024.
ESL eTRUconect system; https://eslpwr.com/etruconnect/; last accessed
Sep. 17, 2024 Sep. 17, 2024.

* cited by examiner

SHORE POWER CONNECTION ALERT SYSTEM FOR AN OVER-THE-ROAD VEHICLE

CROSS-REFERENCE TO RELATED APPLICATION

This application takes priority to U.S. Provisional Patent Application No. 63/509,871, filed Jun. 23, 2023, which is hereby incorporated by reference in its entirety.

TECHNICAL FIELD

The present subject matter relates generally to a shore power connection alert system for an over-the-road vehicle.

BACKGROUND

Over-the-road (OTR) vehicles refers to long-haul vehicles or cargo vehicles adapted for use on roadways. OTR vehicles include, but are not limited to, semi-trucks, box trucks or the like. The OTR vehicle includes a cab and a cargo area. The cargo area is used to store goods during transport. In terms of a semi-truck, the cargo area is provided within a trailer that is towed by a tractor including the cab. In terms of a box truck, the cab and a body defining the cargo area are formed by a single body (e.g., the cab does not tow the body defining the cargo area). Some cargo areas, such as refrigerated cargo areas, include a refrigeration unit that keeps the temperature of an interior of the cargo area at a desired temperature. The refrigeration unit generally includes a combustion engine that supplies power to the refrigeration unit.

Some local regulations require that during loading procedures at a loading dock, the combustion engine of the refrigeration unit, or any other combustion engine of the OTR vehicle, be turned off (e.g., not idling). As a non-limiting example, the state of California requires that the combustion engine of the refrigeration unit be turned off during the loading procedures. As such, during the loading procedures, the refrigeration unit may lose its source of power if local regulations dictate the combustion engine of the refrigeration unit be turned off during the loading procedures.

In some instances, the cargo area can include perishable items (e.g., food stuffs, medical supplies, etc.). As the loading procedures can take hours, the continued operation of the refrigeration unit can be required to ensure that the goods within the cargo area do not spoil. One remedy for this issue is to electrically couple the OTR vehicle to a shore power connection of the loading dock. The shore power connection includes, but is not limited to, an electrical power source received from the dock that the OTR vehicle is loading onto.

In non-limiting examples, once the loading procedure is finished, the driver of the OTR vehicle moves their vehicle from the dock. In some cases, the driver may drive off without realizing the OTR vehicle is still connected to the shore power connection. When an OTR vehicle drives away while still being connected to a shore power connection it can cause damage to the trailer, the electrical cord, or the source of the shore power connection. Further, an uncontrolled disconnection of shore power connection from the OTR vehicle can result in a live wire from the shore power connection to be left exposed, thus creating a safety hazard.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
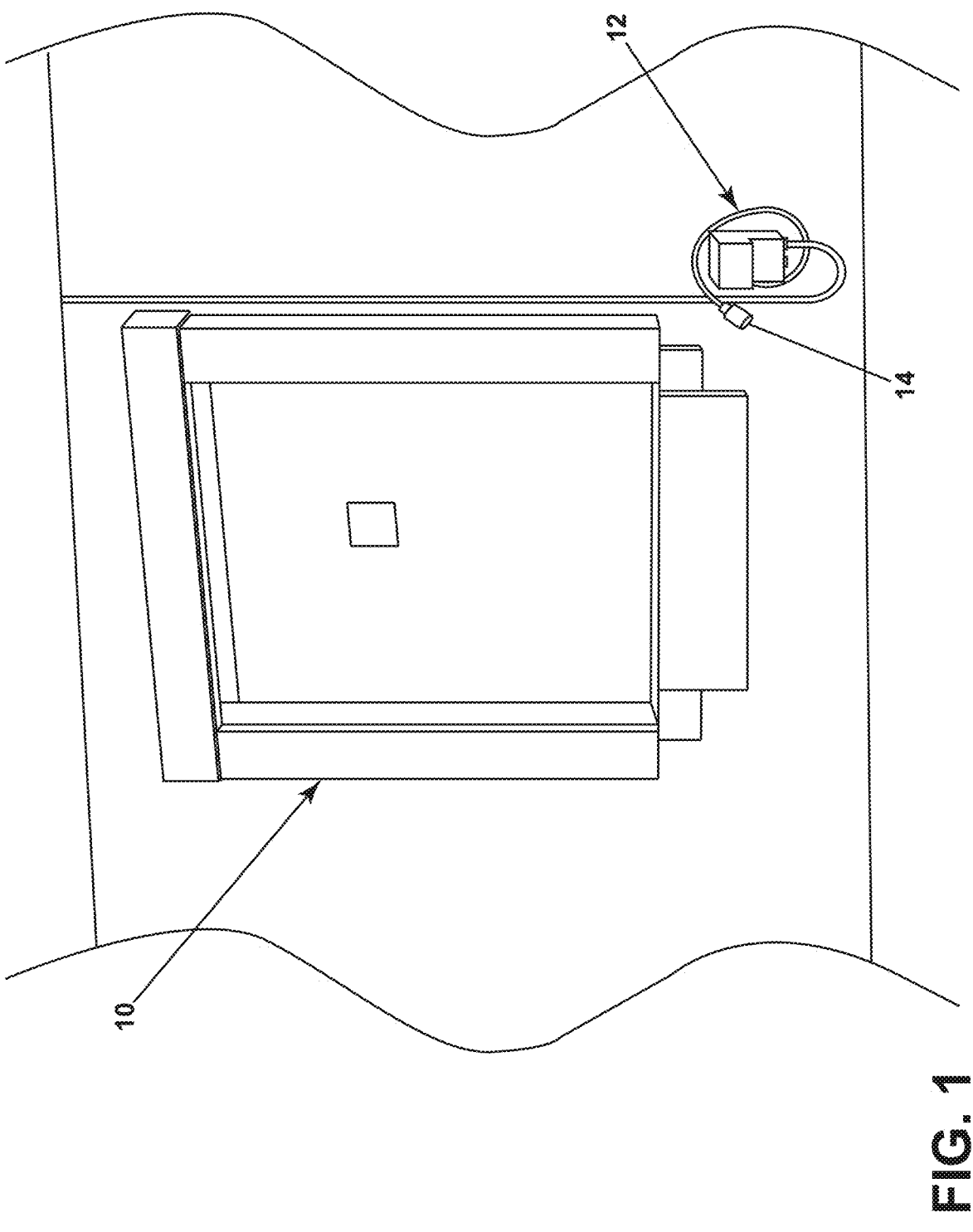
FIG. 1 is a schematic perspective view of a loading dock including a shore power connection in accordance with various aspects described herein.

Aspects of this disclosure are related to a shore power connection alert system for an OTR vehicle. As used herein, the OTR vehicle is any suitable vehicle adapted for use on a road network and configured to carry, haul, or otherwise tow at least one cargo area. The OTR vehicle, as a non-limiting example, is a semi-truck, a box truck, or the like. The at least one cargo area is any suitable container, platform, or area configured to store and transport a volume of items or goods such as, but not limited to, food stuffs, medical supplies, or the like. The OTR vehicle includes a parking brake system and refrigeration unit. The refrigeration unit can include a refrigeration power unit (RPU) configured to power the refrigeration unit. The parking brake system includes a parking brake. The shore power connection alert system is fluidly couplable to the parking brake system of the OTR vehicle.

It is contemplated that during a loading procedure of the OTR vehicle, the OTR vehicle can be coupled to a shore power connection. Specifically, the OTR vehicle can be coupled to the shore power connection to ensure a continued use of the refrigeration unit without need of idling or otherwise a continued use of the RPU. As used herein, the loading procedure includes any method or action of putting goods onto or removing goods from the OTR vehicle and transferring the goods from or to, respectively, a loading dock. It will be appreciated that the loading procedure further includes any intervening steps such as, but not limited to, a staging step prior to loading the goods into the cargo area. The staging step, as used herein, includes the process of running the refrigeration unit of the OTR vehicle to ensure that the temperature of the cargo area is at a desired value prior to loading goods into the cargo area.

The shore power connection supplies a flow of power to a respective portion of the OTR vehicle. As a non-limiting example, the shore power connection supplies a flow of power to a refrigeration unit mounted on the OTR vehicle. The shore power connection alert system creates an alert transmission if the parking brake system is disengaged while the OTR vehicle is connected to the shore power connection. The parking brake system is disengaged by supplying a flow of compressed or pressured air to the parking brake. In the disengaged state, wheels of the OTR vehicle are free to move without resistance from the parking brake system. The parking brake system is engaged by removing the flow of compressed air from the parking brake line. In the engaged state, wheels of the OTR vehicle are restricted in movement due to the closed or engaged state of the parking brake.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are used only for identification purposes to aid the reader's understanding of the present disclosure, and should not be construed as limiting on an embodiment, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another.

The exemplary drawings are for purposes of illustration only and the dimensions, positions, order and relative sizes reflected in the drawings attached hereto can vary.

FIG. 1 is a schematic perspective view of a loading dock 10. The loading dock 10 includes a shore power connection 12. The shore power connection 12 includes a lead 14. The shore power connection 12 is configured to supply a flow of power through the lead 14. The shore power connection 12 is connected to a power supply (not illustrated) of the loading dock 10. The power supply, for example, is a 440-volt AC power source. It will be appreciated, however, that the power supply is any suitable power supply configured to supply a flow of power through the shore power connection 12.

Figure 2:
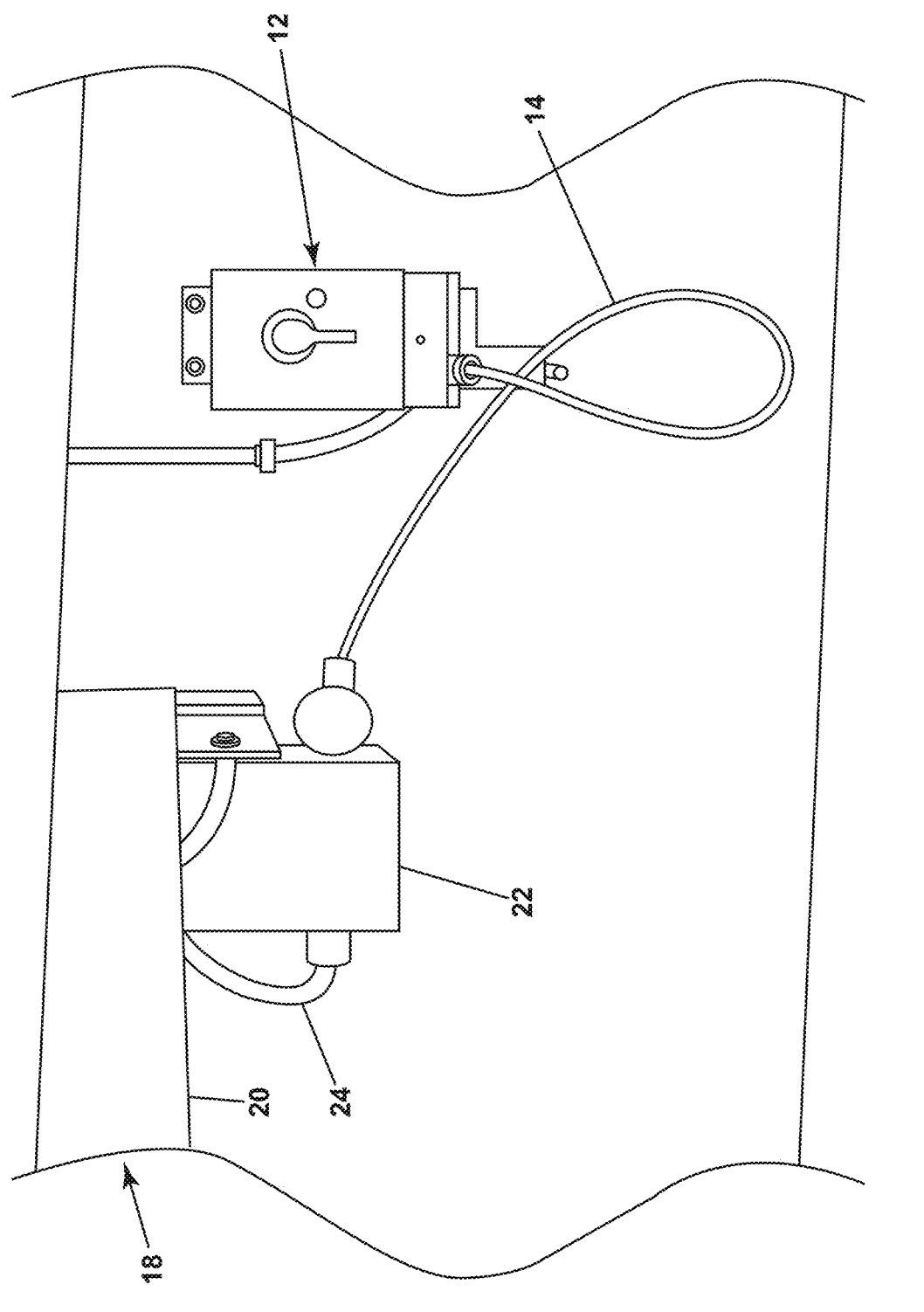
FIG. 2 is a schematic perspective view of the loading dock of FIG. 1, further illustrating an OTR vehicle received within the dock and connected to the shore power connection in accordance with various aspects described herein.

FIG. 2 is a schematic perspective view of the loading dock 10 of FIG. 1 with an OTR vehicle 18 received within a respective portion of the loading dock 10. The OTR vehicle 18 includes a cargo area 20. The OTR vehicle 18 is any suitable vehicle adapted for transport over a road network and configured to move or otherwise ship products within a cargo area 20.

The OTR vehicle 18 includes a shore power connector 22. The shore power connector 22 is provided along any suitable portion of the OTR vehicle 18. As described herein, the OTR vehicle 18 is a semi-truck that includes a trailer defining the cargo area 20. It will be appreciated, however, that the present disclosure has general applicability towards any suitable OTR vehicle 18 with an air brake system including independent service and emergency lines such as, but not limited to, the semi-truck, a box truck, or the like. It will be appreciated that the use of the word "cargo area" refers to any body or space of the OTR vehicle 18 that is used to house goods for transport. The shore power connector 22 can be, for example, provided along a portion of the cargo area 20 (e.g., trailer). The shore power connector 22 is connected to a power transmission line 24 that supplies the flow of power from the shore power connection 12 to a respective portion of the OTR vehicle 18. The shore power connector 22 includes any suitable component that enables the transmission of power between the shore power connection 12 and the power transmission line 24.

During a loading procedure of the OTR vehicle 18, specifically of the cargo area 20, the OTR vehicle 18 is connected to the shore power connection 12. The connection between the shore power connector 12 and the OTR vehicle 18 is made by connecting the lead 14 into the shore power connector 22. It will be appreciated that the supply of power from the shore power connection 12 is used, for example, to supply a flow of power to a respective portion of the cargo area 20 that is necessary to run during the loading procedure of the OTR vehicle 18. As a non-limiting example, the cargo area 20 can be a refrigerated cargo area adapted to transport goods that need to be stored at a certain temperature such as, but not limited to, food stuffs, medical supplies, or the like. The use of the shore power connection 12 ensures that a flow of power is supplied to a respective portion of the cargo area 20 during the loading or unloading procedure. This, in turn, eliminates the need for a respective portion OTR vehicle 18 to generate and supply power through other methods (e.g., continued use of a combustion engine or other power unit within the OTR vehicle 100) during the loading or unloading procedures.

Figure 3:
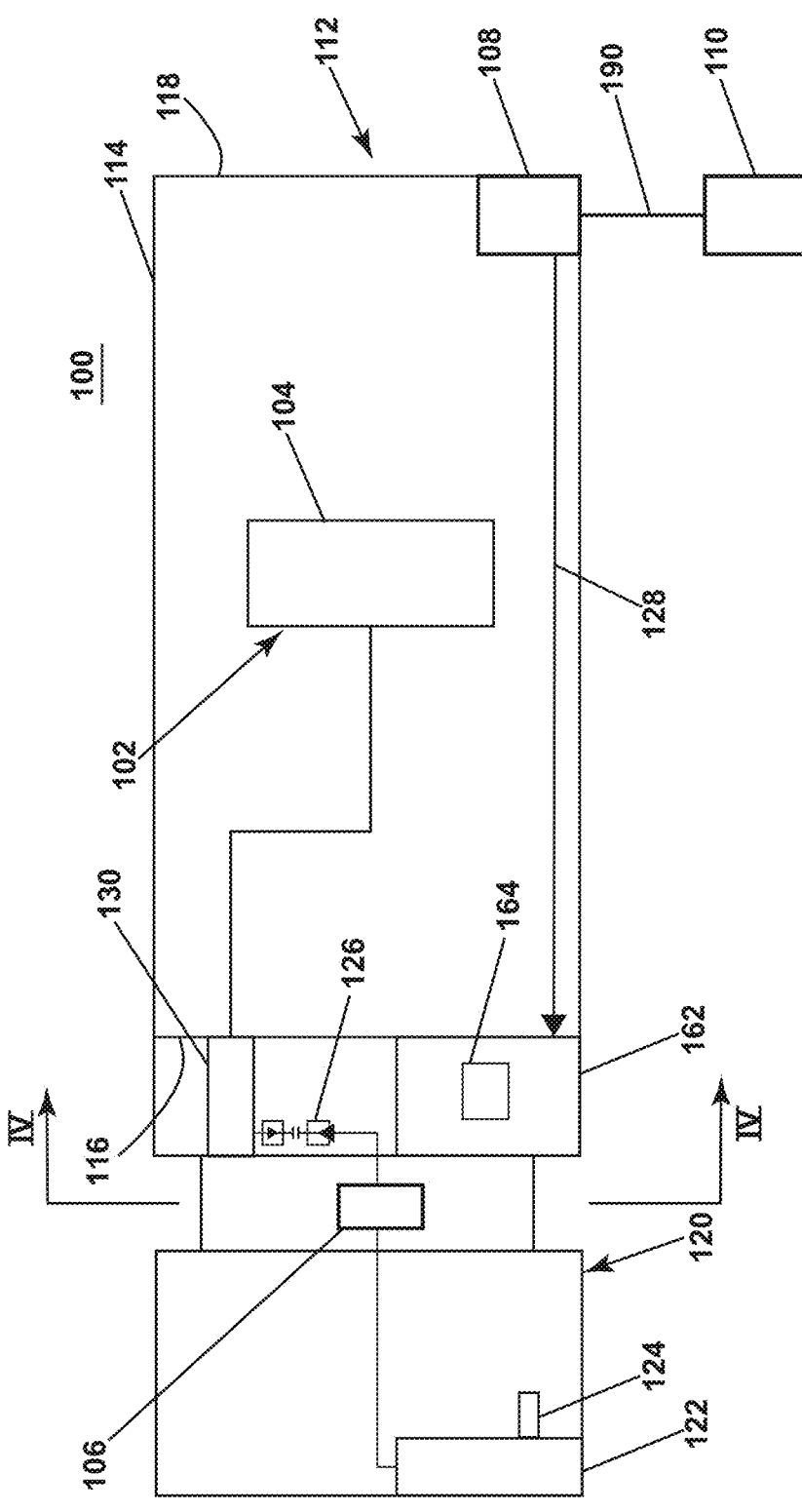
FIG. 3 is a schematic top-view of an exemplary OTR vehicle suitable for use with the shore power connection of FIG. 1, further illustrating a parking brake system and a shore power connection alert system in accordance with various aspects described herein.

FIG. 3 is a schematic top-view of an exemplary OTR vehicle 100 suitable for use with the shore power connection 12 of FIG. 1. The OTR vehicle 100 is couplable to a shore power connection 110. The shore power connection 110 and the OTR vehicle 100 are similar to the shore power connection 12 and the OTR vehicle 18 of FIGS. 1 and 2; therefore, like parts will be identified with like names with it being understood that any description of the shore power connection 12 and the OTR vehicle 18 applies the shore power connection 110 and the OTR vehicle 100, respectively, unless noted otherwise.

The OTR vehicle 100 includes a cab 120, a cargo area 112, a refrigeration unit 162, a parking brake system 102, and a shore power connection alert system 130. As illustrated, the OTR vehicle 100 is a semi-truck that tows a trailer defining the cargo area 112. It will be appreciated, however, that the shore power connection alert system 130 is applicable to any suitable OTR vehicle such as, but not limited to, a semi-truck, a box truck, or the like.

The cab 120 is defined as any suitable portion of the OTR vehicle 100 adapted to receive a user or driver of the OTR vehicle 100 in order to drive or otherwise operate the OTR vehicle 100. The cargo area 112 includes a cargo area body 114. The cargo area body 114 includes, at least, a front surface 116 and a rear surface 118. The front surface 116 confronts the cab 120. The cab 120, as described herein, includes a seat for the user (not illustrated) and housing a primary combustion engine (e.g., a diesel engine). The primary combustion engine is configured to supply a mechanical input to a respective portion (e.g., wheels, generators, etc.) of the OTR vehicle 100 to enable operation (e.g., driving) of the OTR vehicle 100. It will be appreciated that the cab 120 is removably coupled to the cargo area 112 when the OTR vehicle 100 is a semi-truck, as illustrated. When the OTR vehicle 100 is a box truck, or the like, the cab 120 is non-removably coupled to a trailer that defines the cargo area 112.

The refrigeration unit 162 is thermally or otherwise fluidly coupled to an interior of the cargo area body 114 where cargo is stored. The refrigeration unit 162 includes a RPU 164. The RPU 164 defines a source of power to the refrigeration unit 162 during use (e.g., driving) of the OTR vehicle 100. The RPU 164 is any suitable power unit that is configured to power the refrigeration unit 162. The RPU 164 is, but is not limited to, at least one of a combustion engine, a battery pack, a solar panel, a wind turbine, or a combination thereof. As a non-limiting example, the RPU 164 is a combustion engine that is configured to generate a mechanical output through combustion of at least one fuel including, but not limited to, diesel, gasoline, propane, butane, natural gas, hydrogen, or the like.

The refrigeration unit 162 is configured to maintain a temperature of the interior of the cargo area 114 at a desired temperature. The refrigeration unit 162 is coupled to any suitable portion of the cargo area body 114. As a non-limiting example, the refrigeration unit 162 is coupled to the front surface 116.

The OTR vehicle 100 includes a shore power connector 108. The shore power connector 108 is electrically coupled to a respective portion of the OTR vehicle 100. As a non-limiting example, the shore power connector 108 is electrically coupled to the refrigeration unit 162 through a power transmission line 128. The power transmission line 128 is configured to transmit a flow of power from the shore power connector 108 to, for example, the refrigeration unit 162.

The parking brake system 102 is defined as any suitable part, collection of parts, or assembly that utilizes a compressed or pressurized fluid (e.g. air) to maintain the position of or otherwise limit the movement of wheels (not illustrated) of the OTR vehicle 100. The parking brake system 102 includes a compressed air source 106 and a parking brake 104. The compressed air source 106 is provided along any suitable portion of the OTR vehicle 100. As a non-limiting example, the compressed air source 106 is provided along a respective portion of the cab 120. While a single parking brake 104 is illustrated, it will be appreciated that the parking brake system 102 includes any number of one or more parking brakes 104.

The parking brake system 102 includes a parking brake dash valve 122. The parking brake dash valve 122 is provided within the cab 120. The parking brake dash valve 122 includes a parking brake actuator 124. The parking brake actuator 124 is any suitable actuator such as, but not limited to, a knob, a button, a lever, or the like that is accessible to the driver of the OTR vehicle 100 when they are within the cab 120.

It will be appreciated that the parking brake system 102 spans from the cab 120 to the cargo area 112. As the cab 120 and the cargo area 112 can be formed as separate entities that are coupled to each other, the parking brake system 102 includes a structure to fluidly couple the parking brake system 102 provided along the cab 120 to the parking brake system 102 provided along the cargo area 112 (e.g., the parking brake 104). The parking brake system 102 can include a connection 126 fluidly coupling the parking brake system 102 provided along the cab 120 to the parking brake system 102 provided along the cargo area 112 (e.g., the parking brake 104). The connection 126 is any suitable connection such as, but not limited to, a gladhand connection. It will be appreciated that the connection 126 is only used when the OTR vehicle 100 includes the cab 120 separate from the cargo area 112. When the OTR vehicle 100 is formed with the cab 120 and the cargo area 112 as a single entity (e.g., a box truck), the connection 126 is omitted.

The shore power connection alert system 130 is coupled to or otherwise provided along any suitable portion of the OTR vehicle 100. As a non-limiting example, the shore power connection alert system 130 is coupled to or otherwise provided along the front surface 116 of the cargo area body 114.

The shore power connection alert system 130 is fluidly coupled to a respective portion of the parking brake system 102. As a non-limiting example, the shore power connection alert system 130 is provided fluidly between the connection 126 and the parking brake 104.

During loading procedures of the OTR vehicle 100, the parking brake 104 is engaged. The engagement of the parking brake 104 is done by actuating the parking brake actuator 124. Specifically, engagement of the parking brake 104 is done by removing a flow of compressed air (e.g., from the compressed air source 106) from the parking brake system 102. The absence of the flow of compressed air to the parking brake 104 causes the parking brake 104 to engage, thus stopping movement of or otherwise limiting the movement of wheels (not illustrated) of the OTR vehicle 100.

Some local regulations restrict the idling of the RPU 164. As such, the refrigeration unit 162 cannot run through power generated by the RPU 164 during the loading procedures. Therefore, the refrigeration unit 162 must receive a flow of power from an external power source that complies with local regulations in order to keep the cargo area 112 at a desired temperature. The desired temperature, as used herein, is a temperature determined by those loading or otherwise utilizing the OTR vehicle 100 that will ensure the goods within the cargo area 112 do not spoil due to being too hot or too cold. Connection of the OTR vehicle 100 to the shore power connection 110 during the loading procedures ensures that the refrigeration unit 162 continues to operate without need for use of the RPU 164.

Figure 4:
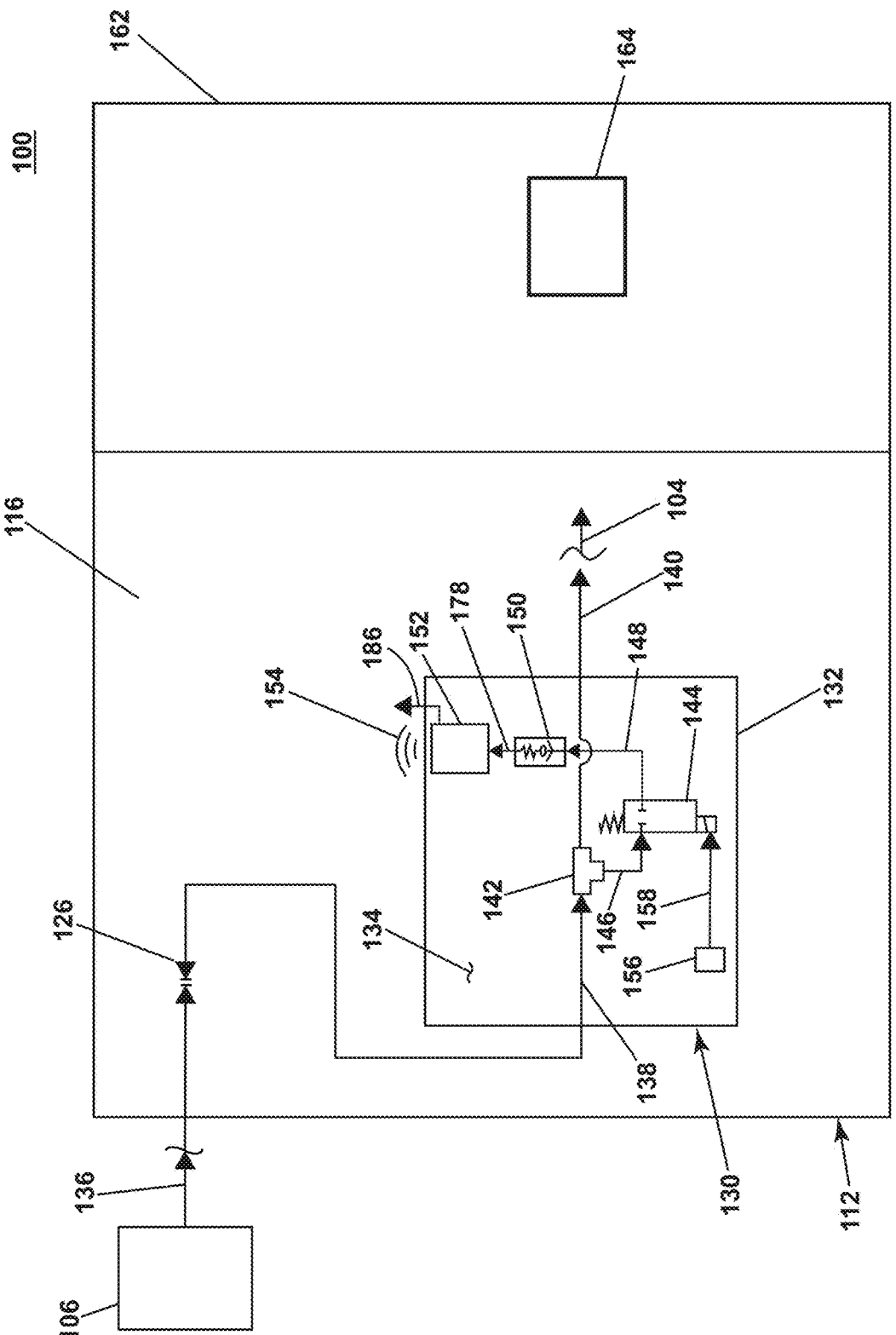
FIG. 4 is a schematic view of the OTR vehicle as seen from sight-line IV-IV of FIG. 3, further illustrating the shore power connection alert system when the parking brake system is engaged and the shore power connection is not coupled to the OTR vehicle in accordance with various aspects described herein.

FIG. 4 is a schematic view of the OTR vehicle 100 as seen from sight-line IV-IV of FIG. 3. The cargo area 112, as illustrated, is removed from the cab 120 (FIG. 3) for purposes of illustration. The compressed air source 106 is schematically illustrated as supplying a compressed air input 136 to the connection 126. The connection 126 is coupled to the cargo area 112. The connection 126 is coupled to the front surface 116 of the cargo area 112.

The shore power connection alert system 130 can include a housing 132. The housing 132 defines an interior 134. The housing 132 is couplable to a respective portion of the cargo area 112. As illustrated, the housing 132, and therefore the shore power connection alert system 130, is couplable to the front surface 116. While described in terms of having the housing 132, it will be appreciated that one or more elements of the shore power connection alert system 130 can be formed separate from the housing 132, or otherwise the housing 132 can be omitted.

The shore power connection alert system 130 includes a compressed air inlet line 138 and a compressed air outlet line 140 extending through a respective portion of the interior 134. As used herein, a "compressed air line" (e.g., inlet line, outlet line, etc.) refers to a conduit, tube, or channel configured to transmit a flow of air from one point to another. The compressed air inlet line 138 defines a compressed air line that transmits the compressed air input 136 into the shore power connection alert system 130. The compressed air outlet line 140 defines a compressed air line that transmits the compressed air input 136 out of the shore power connection alert system 130. Put another way, the compressed air inlet line 138 defines a fluid inlet of compressed air form the compressed air source 106 and to the shore power connection alert system 130. The compressed air outlet line 140 defines a fluid outlet of compressed air from the shore power connection alert system 130 and to the parking brake 104.

The shore power connection alert system 130 can include a junction fitting 142. The junction fitting 142 is provided within the interior 134. The junction fitting 142 is directly coupled to the compressed air inlet line 138. As used herein, the phrase "directly coupled to" refers to a coupling between two parts without intervening steps, components, or assemblies. The junction fitting 142 is defined as any suitable component configured to direct a single input into two outputs, or inputs into a single input. As illustrated, the junction fitting 142 takes a single input (e.g., the compressed air inlet line 138) and splits it into two outputs of the compressed air outlet line 140 and a second output which will be described in further detail below. The junction fitting 142 is any suitable fitting such as, but not limited to, a T-fitting, a Y-fitting, or the like.

The shore power connection alert system 130 includes a solenoid valve 144. The solenoid valve 144 is provided within the interior 134. The solenoid valve 144 receives a compressed air input from a fluid input line 146. As illustrated, the fluid input line 146 is the aforementioned second output of the junction fitting 142. Put another way, the fluid input line 146 receives a flow of compressed air from the compressed air input 136. The solenoid valve 144 includes a fluid output line 148. The solenoid valve 144, as illustrated, is a normally-closed solenoid valve.

The shore power connection alert system 130 includes a solenoid input source 156. The solenoid input source 156 is a wired or wireless connection to a respective portion of the OTR vehicle 100 that is external the shore power connection alert system 130. As a non-limiting example, the solenoid input source 156 can be a receiver configured to receive a wireless transmission from a transmitter external the shore power connection alert system 130. An input to the solenoid input source 156 is transmitted to the solenoid valve 144 through a solenoid valve input 158. The solenoid valve input 158 is a wired or wireless transmission of data, voltage, or current. As illustrated, the solenoid valve input 158 is transmitting a negative input to the solenoid valve 144. As such, the solenoid valve 144 is closed. In the closed position, the fluid input line 146 is not fluidly coupled to the fluid output line 148. In any case, the solenoid input source 156 is any suitable source that originates from exterior the shore power connection alert system 130.

The shore power connection alert system 130 can include a check valve 150 fluidly coupled to the fluid output line 148. The check valve 150 is provided within the interior 134. The check valve 150 is biased to allow for a flow of fluid from the fluid output line 148 flow out of the check valve 150. The check valve 150 is biased to stop a fluid or contaminants (e.g., debris, bugs, etc.) from flowing through the check valve 150 and into the fluid output line 148. The check valve 150 is any suitable check valve 150 such as, but not limited to, a diaphragm check valve, a spring-biased check valve, or the like.

The shore power connection alert system 130 includes a transmission unit 152 fluidly coupled to a compressed air alert line 178. The transmission unit 152 is provided within the interior 134 or otherwise along the housing 132. The transmission unit 152 is configured to produce an alert transmission 154 if a flow of compressed air is fed to the transmission unit 152 through the compressed air alert line 178. The alert transmission 154 is emitted exterior the housing 132. In the illustrated configuration, a flow of compressed air is not fed to the transmission unit 152 as the solenoid valve 144 is in an off state. As such, the alert transmission 154 would not be generated in the illustrated configuration. The illustrated configuration is shown for illustrative purposes only.

The transmission unit 152 is any suitable component configured to produce alert transmission 154. As a non-limiting example, the transmission unit 152 is an alarm (e.g., a whistle) configured to produce the alert transmission 154 in the form of an audible transmission. As a non-limiting example, the transmission unit 152 is a pressure switch that is configured to produce the alert transmission 154 in the form of a digital transmission (wireless or wired). As a non-limiting example, the transmission unit is a physical transmitter configured to produce the alert transmission 154 in the form of a physical indication (e.g., a light, a vibration, a movement, or the like). It will be appreciated that the transmission unit 152 is any suitable component or combination of components configured to produce the alert transmission 154 in the form of at least one of the audible indication, physical indication, digital indication, or a combination thereof. It will be appreciated that the alert transmission 154 can be a wired transmission, wireless transmission, or a combination thereof. As a non-limiting example, the alert transmission 154 can be a digital signal that causes a visual or physical transmission to occur exterior the shore power connection alert system 130 (e.g., within the cab 120 of FIG. 3).

The transmission unit 152 can further include an exhaust 186. The exhaust 186 takes the compressed air that is fed to the transmission unit 152 through the compressed air alert line 178 and exhausts it exterior the transmission unit 152. When the housing 132 is included, the exhaust 186 exhausts the compressed air exterior the housing 132. The transmission unit 152 can further include any other additional component or element such as, but not limited to, a duckbill valve provided along the exhaust 186 to prevent ingress of contaminants into the exhaust 186 from exterior the shore power connection alert system 130.

Figure 5:
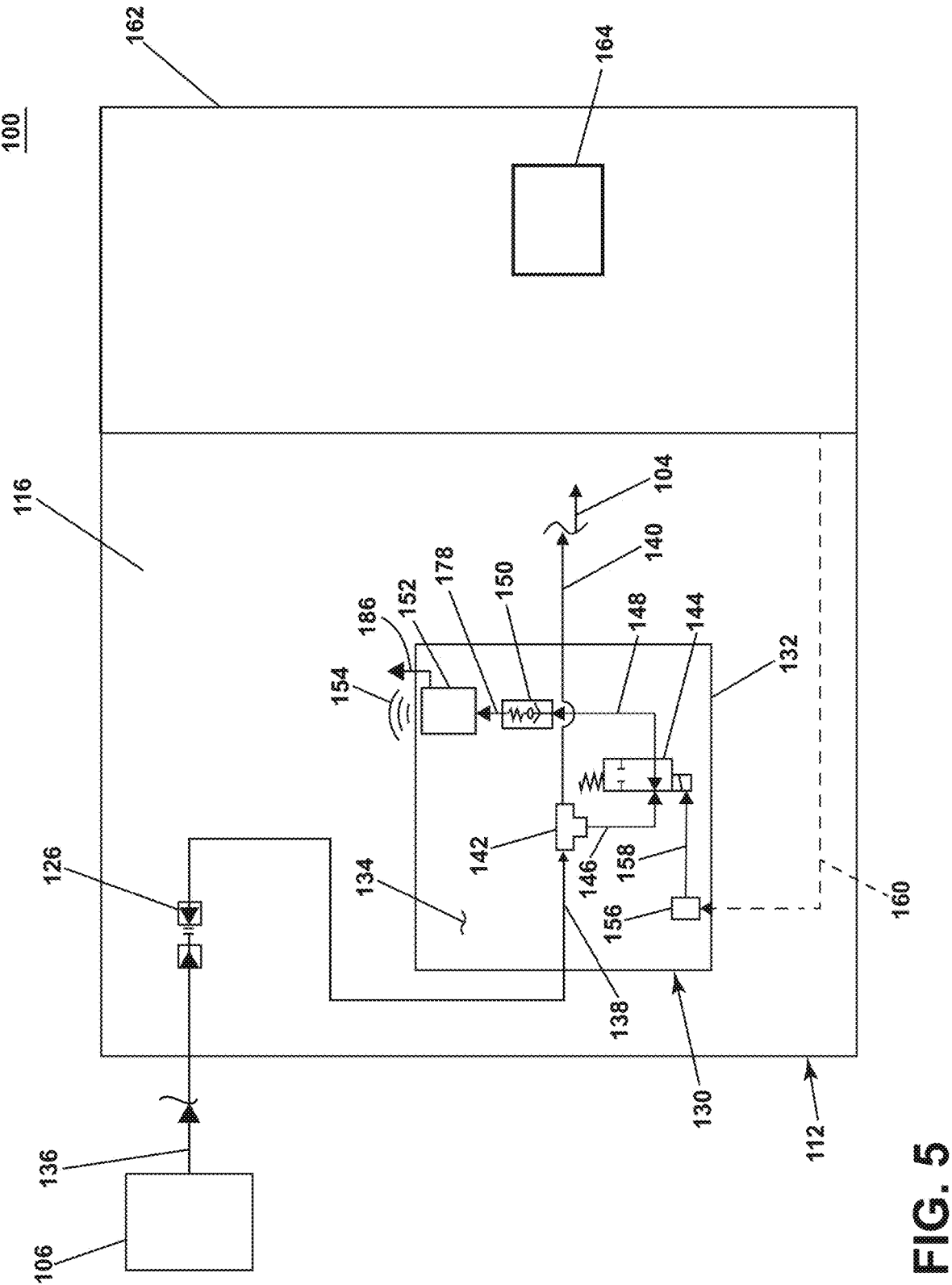
FIG. 5 is a schematic view of the OTR vehicle as seen from sight-line IV-IV of FIG. 3, further illustrating the shore power connection alert system when the parking brake system is engaged and the shore power connection is coupled to the OTR vehicle in accordance with various aspects described herein.

FIG. 5 is a schematic view of the OTR vehicle 100 as seen from sight-line IV-IV of FIG. 3. As illustrated, the solenoid valve input 158 is transmitting a positive input to the solenoid valve 144. As such, the solenoid valve 144 is in an opened position rather than a closed position, as illustrated in FIG. 4. Therefore, the solenoid valve 144 fluid input line 146 is fluidly coupled to the fluid output line 148.

The solenoid input source 156, as a non-limiting example, is a refrigeration unit input 160 received from the refrigeration unit 162. The refrigeration unit input 160, for example, is a voltage or current supplied to the shore power connection alert system 130 that is present only when the refrigeration unit 162 is running or otherwise powered.

With reference to FIGS. 3-5, the shore power connection alert system 130 receives the compressed air input 136 through the connection 126. The compressed air input 136 is fed to the junction fitting 142 through the compressed air inlet line 138. The compressed air input 136 is ultimately fed to the parking brake 104 through the compressed air outlet line 140. The shore power connection alert system 130 ensures that the alert transmission 154 is generated if the parking brake system 102 of FIG. 3 is disengaged while OTR vehicle 100 is receiving a flow of power from the shore power connection 110.

Specifically, the solenoid valve 144 is actuatable (e.g., opened or closed by) the reception of the solenoid valve input 158 from the solenoid input source 156. The solenoid valve input 158 is indicative of whether or not the OTR vehicle 100 is connected to the shore power connection 110. As a non-limiting example, if the OTR vehicle 100 is connected to the shore power connection 110, the refrigeration unit 162 can supply a current or voltage via the refrigeration unit input 160 to the solenoid input source 156. The supply of the current, voltage, or any other indication to the solenoid input source 156, in turn, causes the solenoid valve 144 to open via a positive transmission through the solenoid valve input 158.

If, while the solenoid valve 144 is in the open position, compressed air from the compressed air source 106 is fed through a respective portion of parking brake system 102 in an attempt to disengage the parking brake 104, at least a portion of the flow of compressed air will be diverted to the compressed air alert line 178. The flowing of the compressed air within the compressed air alert line 178, in turn causes the alert transmission 154 to be generated through the transmission unit 152. The alert transmission 154 indicates to the driver or those near the OTR vehicle 100 that the parking brake 104 has been disengaged while the OTR vehicle 100 is still connected to the shore power connection 110. This indication, in turn, allows for the driver or those near the OTR vehicle 100 to react accordingly by, for example, engaging the parking brake system 102, removing themselves from the immediate area surrounding the shore power connection 110 or OTR vehicle 100, or otherwise disconnecting the OTR vehicle 100 from the shore power connection 110. This indication reduces the possibility of damage to the loading dock (e.g., the loading dock 10 of FIG. 1), damage to the OTR vehicle 100, the creation of a safety hazard in the form of an exposed and live lead 190, or a combination thereof.

It will be further appreciated that the shore power connection alert system 130 can be designed to limit or otherwise stop the disengagement of the parking brake 104 if the shore power connection 110 is connected to the OTR vehicle 100. Specifically, the shore power connection alert system 130 can be designed to divert the compressed air input 136 to the compressed air alert line 178 to produce the alert transmission 154 rather than diverting the compressed air input 136 to the parking brake 104 to disengage the parking brake. As a non-limiting example, compressed air input 136 will take the path of least resistance. The shore power connection alert system 130 can be designed such that the flow of the compressed air through the solenoid valve 144 and into the compressed air alert line 178 is the path of least resistance. As such, the parking brake 104 can remain engaged while the alert transmission 154 is generated. The continued engagement of the parking brake 104, in turn, causes an additional form of an alert transmission by providing force against the movement of the wheels. As such, the driver and those around the OTR vehicle 100 will not only be alerted through the alert transmission 154, but also the resistance caused by the continued engagement of the parking brake 104.

The shore power connection alert system 130 can be formed as a modular unit. Put another way, the shore power connection alert system 130 can be formed as a single unit housed within the housing 132. A user or person installing the shore power connection alert system 130 need only connect respective portions of the parking brake system 102 to the compressed air inlet line 138 and the compressed air outlet line 140. Alternatively, the shore power connection system 130 can include one or more non-modular units or components that are coupled to receive portions of the parking brake system 102. As a non-limiting example, the solenoid valve 144 can be a standalone component that is coupled to a respective portion of the parking brake system 102. The transmission unit 152 and any other component of the shore power connection alert system 130 can also be separate units coupled to respective portions of the OTR vehicle 100.

The shore power connection alert system 130 is retrofittable to an existing OTR vehicle 100. Specifically, the shore power connection alert system 130 can be positioned along a respective portion of an existing parking brake system 102. The shore power connection alert system 130 can then be communicatively coupled to (e.g., electrically coupled) to a respective portion of the OTR vehicle 100 (e.g., the refrigeration unit 162) that will act as the solenoid input source 156 to indicate to the shore power connection alert system 130 whether or not the OTR vehicle 100 is connected to the shore power connection 110. Additionally, or alternatively, the shore power connection alert system 130 can be communicatively couplable to the shore power connection system 110. Put another way, the shore power connection system 110 can pair with or otherwise communicate directly with the shore power connection alert system 130 to indicate whether or not the shore power connection 110 is connected to and supplying power to the OTR vehicle 100.

Figure 6:
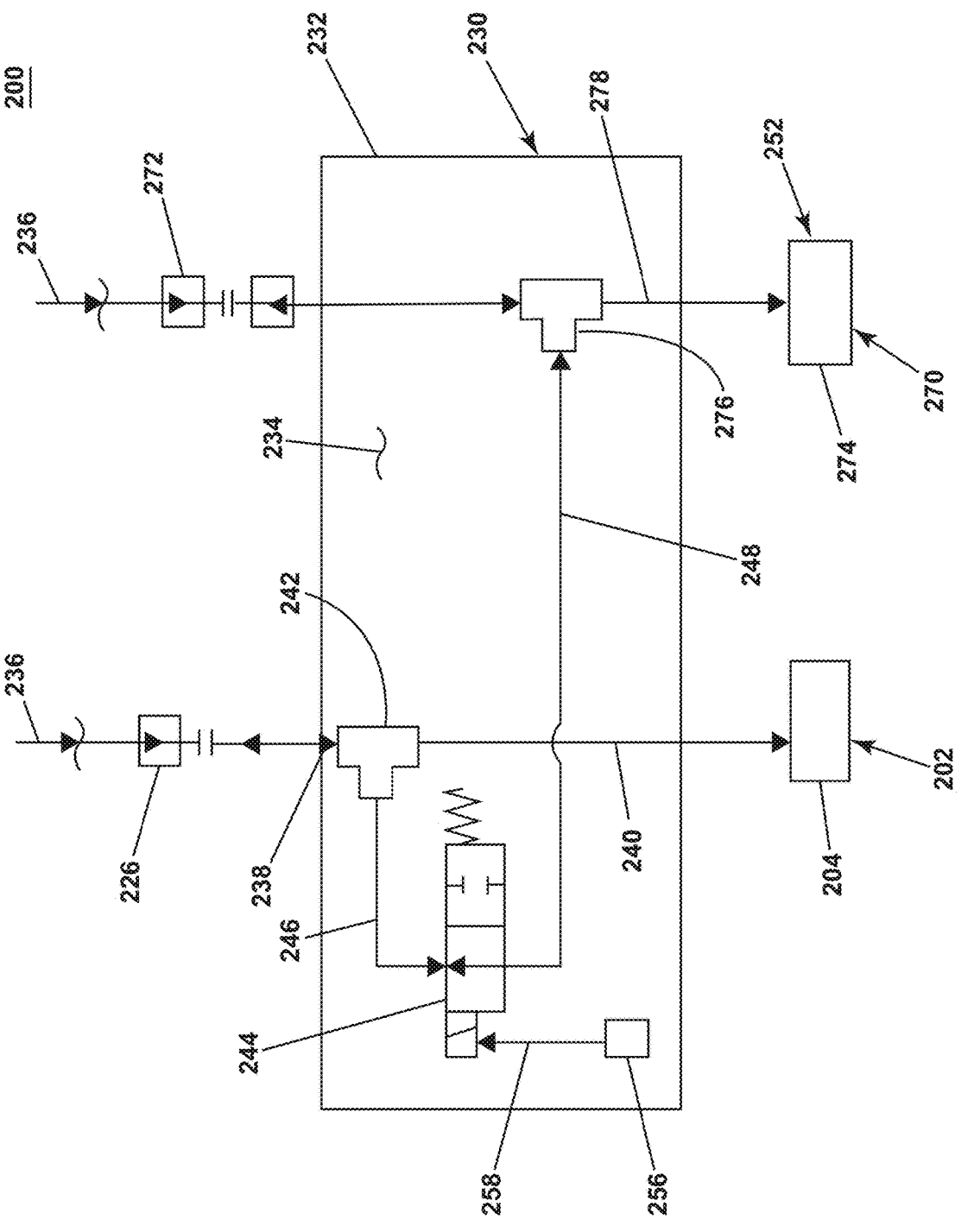
FIG. 6 is a schematic representation of a section of an exemplary OTR vehicle suitable for use as the OTR vehicle of FIG. 3, further illustrating a shore power connection alert system including a connection with a parking brake and a service brake in accordance with various aspects described herein.

FIG. 6 is a schematic representation of a section of an exemplary OTR vehicle 200 suitable for use as the OTR vehicle 100 of FIG. 3 The OTR vehicle 200 is similar to the OTR vehicle 100 (FIG. 0.3); therefore, like parts will be identified with like numerals increased to the 200 series with it being understood that the description of the OTR vehicle 100 applies to the OTR vehicle 200 unless noted otherwise.

The OTR vehicle 200 includes a parking brake system 202, and a shore power connection alert system 230 couplable to a respective portion of the parking brake system 202. The parking brake system 202 includes a compressed air input 236 and a parking brake 204. The parking brake system 202 can included a connection 226.

The shore power connection alert system 230 can include a housing 232 defining an interior 234. The shore power connection alert system 230 includes a solenoid valve 244 having a fluid input line 246 and a fluid output line 248. The fluid input line 246 is selectively fluidly couplable to the fluid output line 248 based on the presence of a solenoid valve input 258 from a solenoid input source 256. The shore power connection alert system 230 includes a first junction fitting 242, a compressed air inlet line 238, a compressed air outlet line 240, a transmission unit 252, and a compressed air alert line 278.

The OTR vehicle 200 is illustrated schematically. It will be appreciated that only a section of the OTR vehicle 200 is shown. It will be appreciated that the OTR vehicle 200 includes any other suitable components described herein such as, but not limited to, a cargo area (e.g., the cargo area 112 of FIG. 3), a cab (e.g., the cab 120 of FIG. 3), a compressed air source (e.g., the compressed air source 106 of FIG. 3), or a combination thereof.

The OTR vehicle 200 is similar to the OTR vehicle 200 (FIG. 3), in that the OTR vehicle 200 includes the shore power connection alert system 230 couplable to a respective portion of the parking brake system 202. The OTR vehicle 200, however, further includes a service brake system 270 fluidly couplable to the shore power connection alert system 230. While not described with relation to the OTR vehicle 100, it will be appreciated that the OTR vehicle 100 or any other OTR vehicle described herein can include a respective service brake system. Put another way, the service brake system 270 is an existing architecture on the OTR vehicle 200 or any other OTR vehicle.

The service brake system 270 includes a service brake 274. In instances where the OTR vehicle 200 is a semi-truck, the service brake system 270 can include a service brake connection 272 (e.g., a service brake gladhand connection). The service brake system 270 can receive the compressed air input 236 to engage the service brake 274. The service brake 274, like the parking brake 204, includes any number of one or more service brakes.

The shore power connection alert system 230 includes a second junction fitting 276, similar to the first junction fitting 242, provided at a junction between the compressed air alert line 278 and the fluid output line 248. The shore power connection alert system 230 is fluidly coupled to the service brake system 270 at the second junction fitting 276 such that the compressed air alert line 278 leads to the service brake 274.

During operation, if the parking brake 204 is disengaged while the solenoid valve 244 is opened, as illustrated (e.g., when the OTR vehicle 200 is connected to a shore power connection, like the shore power connection 110 of FIG. 3), a flow of compressed air flows into the compressed air alert line 278 and to the service brake 274. The service brake system 270 operates opposite the parking brake system 202. Specifically, to engage the service brake 274, a flow of compressed air needs to be fed to the service brake 274. As such, the flowing of the compressed air into compressed air alert line 278 causes the service brake to engage. The flowing of the compressed air to the service brake 274 further acts as an exhaust (e.g., the exhaust 186 of FIG. 4) from the shore power connection alert system 230

The engagement of the service brake 274 is a form of an alert transmission (e.g., the alert transmission 154 of FIG. 4).

It will be appreciated that the engagement of the service brake 274 as the alert transmission can be used in conjunction with any other alert transmission described herein.

Figure 7:
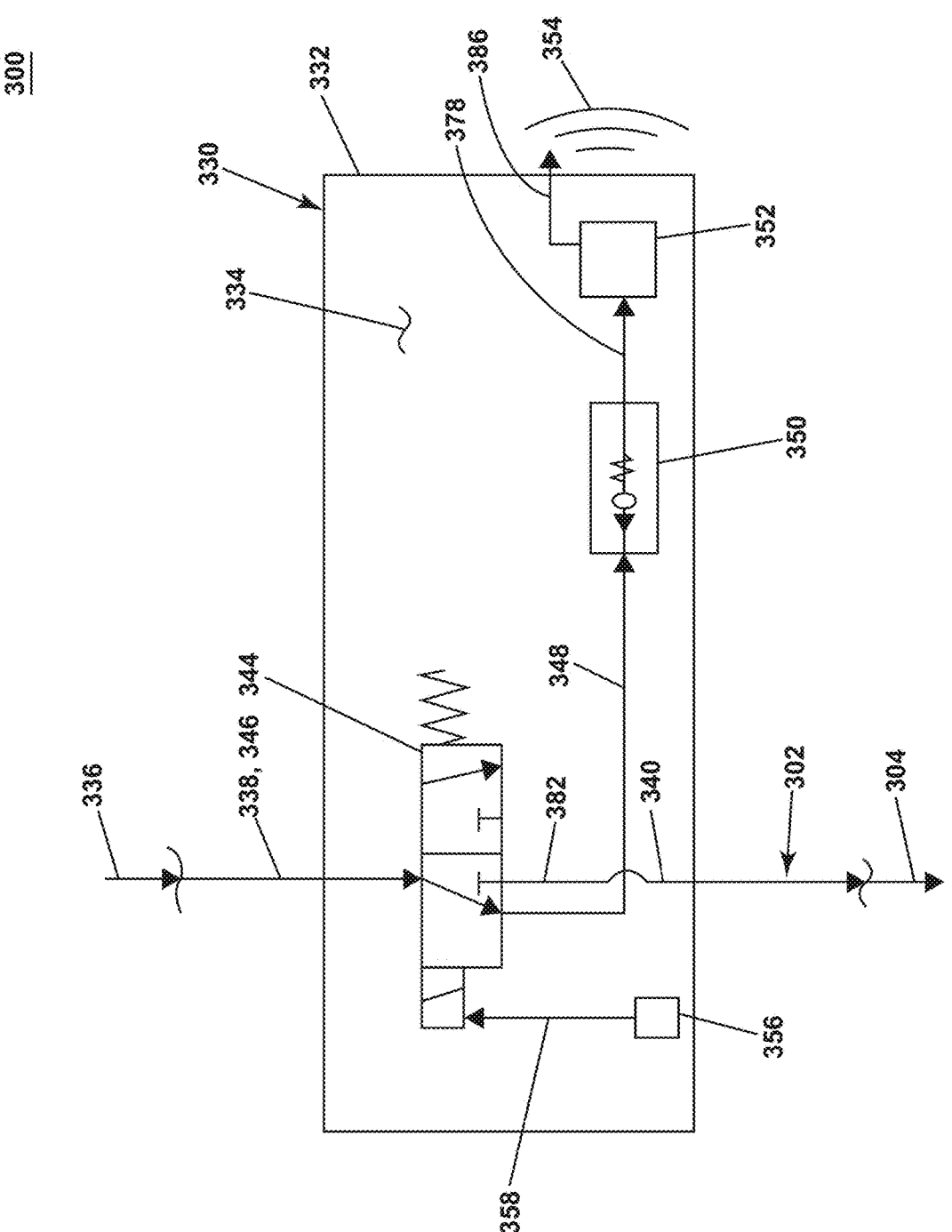
FIG. 7 is a schematic representation of a section of an exemplary OTR vehicle suitable for use as the OTR vehicle of FIG. 3, further illustrating a shore power connection alert system including a solenoid valve having a first fluid output line and a second fluid output line in accordance with various aspects described herein.

FIG. 7 is a schematic representation of a section of an exemplary OTR vehicle 300 suitable for use as the OTR vehicle 100 of FIG. 3 The OTR vehicle 300 is similar to the OTR vehicle 100 (FIG. 0.3), 200 (FIG. 6); therefore, like parts will be identified with like numerals increased to the 300 series with it being understood that the description of the OTR vehicle 100, 200 applies to the OTR vehicle 300 unless noted otherwise.

The OTR vehicle 300 includes a parking brake system 302, and a shore power connection alert system 330 couplable to a respective portion of the parking brake system 302. The parking brake system 302 includes a compressed air input 336 and a parking brake 304.

The shore power connection alert system 330 can include a housing 332 defining an interior 334. The shore power connection alert system 330 includes a solenoid valve 344 having a fluid input line 346 and a first fluid output line 348. The fluid input line 346 is selectively fluidly couplable to the first fluid output line 348 based on the presence of a solenoid valve input 358 from a solenoid input source 356. The shore power connection alert system 330 includes a compressed air inlet line 338, a compressed air outlet line 340, a transmission unit 352, a check valve 350, and a compressed air alert line 378. The transmission unit 352 is configured to generate an alert transmission 354. The transmission unit 352 can be fluidly coupled to an exhaust 386.

The OTR vehicle 300 is illustrated schematically. It will be appreciated that only a section of the OTR vehicle 300 is shown. It will be appreciated that the OTR vehicle 300 includes any other suitable components described herein such as, but not limited to, a cargo area (e.g., the cargo area 112 of FIG. 3), a cab (e.g., the cab 120 of FIG. 3), a compressed air source (e.g., the compressed air source 106 of FIG. 3), or a combination thereof.

The shore power connection alert system 330 is similar to the shore power connection alert system 130 (FIG. 3), 230 (FIG. 6) in that the transmission unit 352 is configured to produce the alert transmission 354 if the transmission unit 352 receives a flow of compressed air via the compressed air alert line 378. The shore power connection alert system 330, however, does not include a junction fitting (e.g., the junction fitting 142 of FIGS. 4 and 5, 242 of FIG. 6). Instead, the compressed air inlet line 338 is directly fluidly coupled to the solenoid valve 344. As such, the compressed air inlet line 338 forms the fluid input line 346. The solenoid valve 344 includes the first fluid output line 348 that leads to the compressed air alert line 378. The solenoid valve 344 further includes a second fluid output line 382 that is directly fluidly coupled to the compressed air outlet line 340. Put another way, the second fluid output line 382 forms the compressed air outlet line 340.

Figure 8:
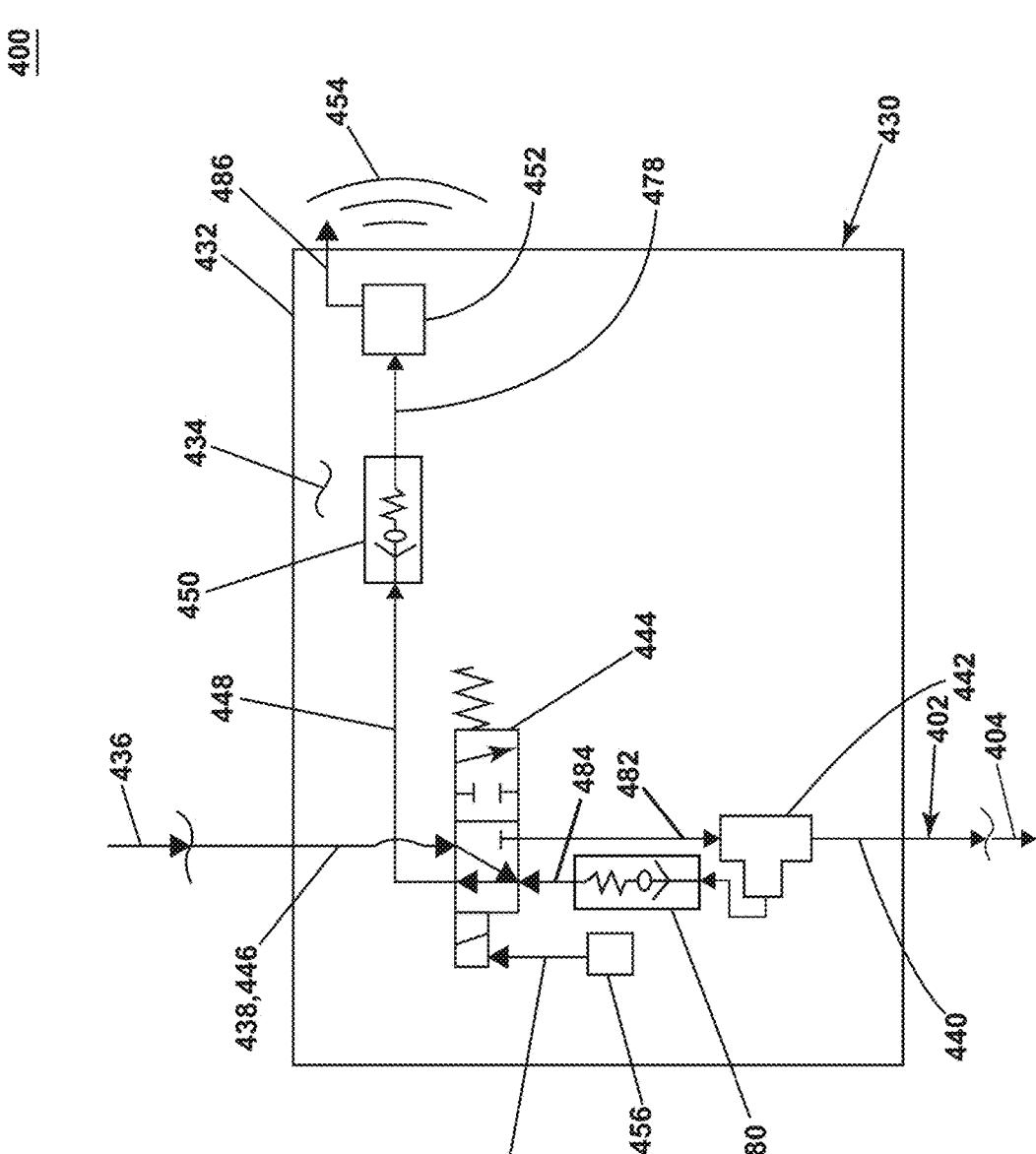
FIG. 8 is a schematic representation of a section of an exemplary OTR vehicle suitable for use as the OTR vehicle of FIG. 3, further illustrating a shore power connection alert system including a solenoid valve having a first fluid input line, a second fluid input line, a first fluid output line, and a second fluid output line in accordance with various aspects described herein.

FIG. 8 is a schematic representation of a section of an exemplary OTR vehicle 400 suitable for use as the OTR vehicle 100 of FIG. 3 The OTR vehicle 400 is similar to the OTR vehicle 100 (FIG. 0.3), 200 (FIG. 6), 300 (FIG. 7); therefore, like parts will be identified with like numerals increased to the 400 series with it being understood that the description of the OTR vehicle 100, 200, 300 applies to the OTR vehicle 400 unless noted otherwise.

The OTR vehicle 400 includes a parking brake system 402, and a shore power connection alert system 430 couplable to a respective portion of the parking brake system 402. The parking brake system 402 includes a compressed air input 436 and a parking brake 404.

The shore power connection alert system 430 can include a housing 432 defining an interior 434. The shore power connection alert system 430 includes a solenoid valve 444 having a first fluid input line 446 and a first fluid output line 448. The first fluid input line 446 is selectively fluidly couplable to the first fluid output line 448 based on the presence of a solenoid valve input 458 from a solenoid input source 456. The shore power connection alert system 430 includes a compressed air inlet line 438, a compressed air outlet line 440, junction fitting 442, a transmission unit 452, a first check valve 450, and a compressed air alert line 478. The transmission unit 452 is configured to generate an alert transmission 454. The transmission unit 452 can be fluidly coupled to an exhaust 486.

The OTR vehicle 400 is illustrated schematically. It will be appreciated that only a section of the OTR vehicle 400 is shown. It will be appreciated that the OTR vehicle 400 includes any other suitable components described herein such as, but not limited to, a cargo area (e.g., the cargo area 112 of FIG. 3), a cab (e.g., the cab 120 of FIG. 3), a compressed air source (e.g., the compressed air source 106 of FIG. 3), or a combination thereof.

The shore power connection alert system 430 is similar to the shore power connection alert system 130 (FIG. 3), 230 (FIG. 6), 330 (FIG. 7), in that the transmission unit 452 is configured to produce the alert transmission 454 if the transmission unit 452 receives a flow of compressed air via the compressed air alert line 478. The compressed air inlet line 438, like the compressed air inlet line 338 (FIG. 0.7), is formed with the first fluid input line 446. The solenoid valve 444, however, includes a second fluid input 484 and a second fluid output 482. The second fluid output 482 extends from the solenoid valve 444 to the junction fitting 442. The junction fitting 442 directs the flow from the second fluid output 482 into at least one of the compressed air outlet line 440, the second fluid input 484, or a combination thereof. When fed into the second fluid input 484, the compressed air is fed to the compressed air alert line 478 via the first fluid output line 448.

The shore power connection alert system 430 further includes a second check valve 480 fluidly coupling the junction fitting 442 to the second fluid input 484. The second check valve 480 prevents backflow of compressed air from the solenoid valve 444 and to the junction fitting 442.

Figure 9:
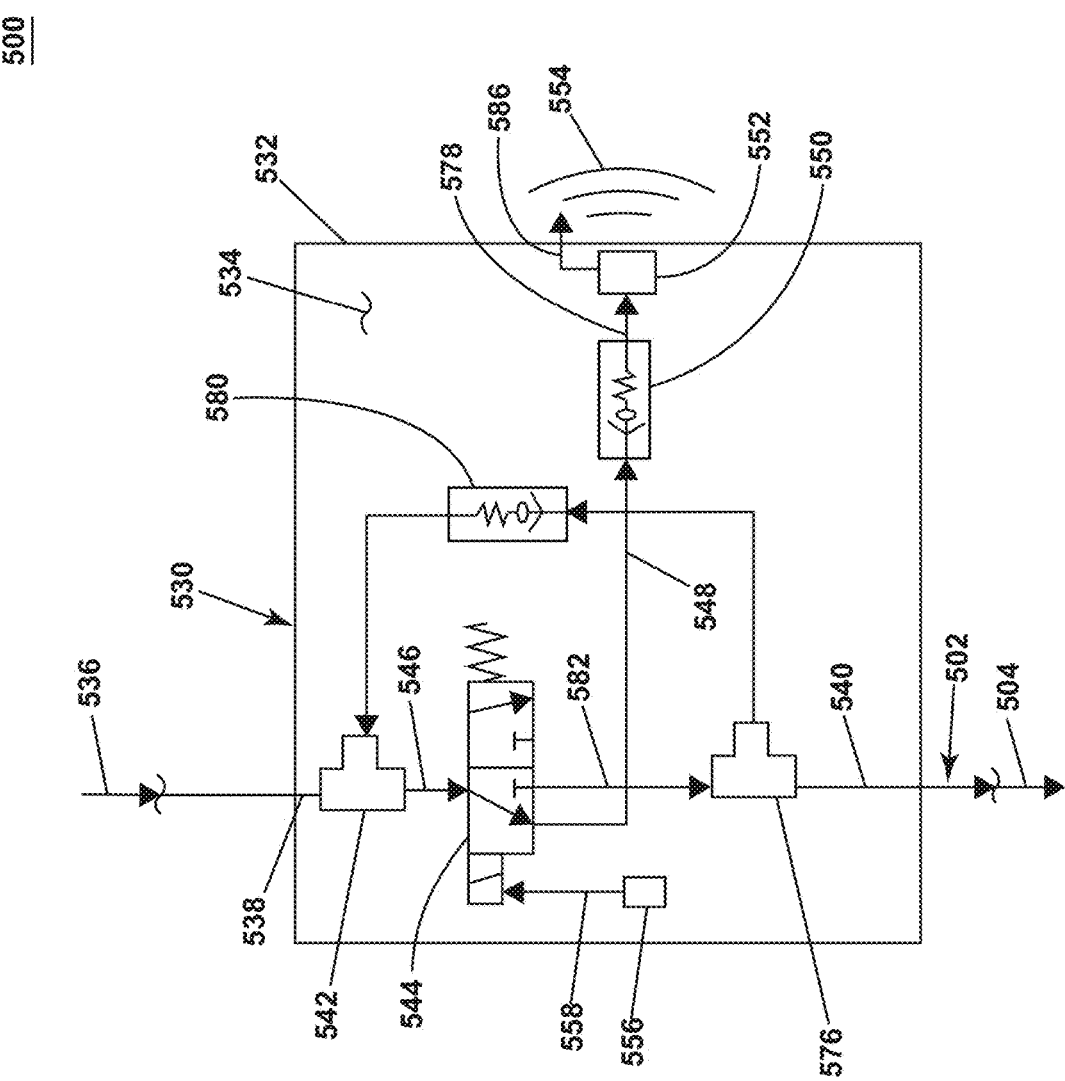
FIG. 9 is a schematic representation of a section of an exemplary OTR vehicle suitable for use as the OTR vehicle of FIG. 3, further illustrating a shore power connection alert system including a first junction fitting, a second junction fitting, and a solenoid valve in accordance with various aspects described herein.

FIG. 9 is a schematic representation of a section of an exemplary OTR vehicle 500 suitable for use as the OTR vehicle 100 of FIG. 3. The OTR vehicle 500 is similar to the OTR vehicle 100 (FIG. 0.3), 200 (FIG. 6), 300 (FIG. 7), 400 (FIG. 8); therefore, like parts will be identified with like numerals increased to the 500 series with it being understood that the description of the OTR vehicle 100, 200, 300, 400 applies to the OTR vehicle 500 unless noted otherwise.

The OTR vehicle 500 includes a parking brake system 502, and a shore power connection alert system 530 couplable to a respective portion of the parking brake system 502. The parking brake system 502 includes a compressed air input 536 and a parking brake 504.

The shore power connection alert system 530 can include a housing 532 defining an interior 534. The shore power connection alert system 530 includes a solenoid valve 544 having a fluid input line 546 and a first fluid output line 548. The fluid input line 546 is selectively fluidly couplable to the first fluid output line 548 based on the presence of a solenoid valve input 558 from a solenoid input source 556. The shore power connection alert system 530 includes a compressed air inlet line 538, a compressed air outlet line 540, a first junction fitting 542, a first check valve 550, a transmission unit 552, a first check valve 550, and a compressed air alert line 578. The transmission unit 552 is configured to generate an alert transmission 554. The transmission unit 552 can be fluidly coupled to an exhaust 586.

The OTR vehicle 500 is illustrated schematically. It will be appreciated that only a section of the OTR vehicle 500 is shown. It will be appreciated that the OTR vehicle 500 includes any other suitable components described herein such as, but not limited to, a cargo area (e.g., the cargo area 112 of FIG. 3), a cab (e.g., the cab 120 of FIG. 3), a compressed air source (e.g., the compressed air source 106 of FIG. 3), or a combination thereof.

The shore power connection alert system 530 is similar to the shore power connection alert system 130 (FIG. 3), 230 (FIG. 6), 330 (FIG. 7), 430 (FIG. 8), in that the transmission unit 552 is configured to produce the alert transmission 554 if the transmission unit 552 receives a flow of compressed air via the compressed air alert line 578. The shore power connection alert system 530, like the shore power connection alert system 330, 430, includes the solenoid valve having a second fluid output line 582. The shore power connection alert system 530 further includes a second junction fitting 576 fluidly coupled at a junction between the second fluid output line 582, a line extending to the first junction fitting 542, and the compressed air outlet line 540. A second check valve 580 fluidly couples the first junction fitting 542 and the second junction fitting 576. The second check valve 580 prevents flow of compressed air from the first junction fitting 542 to the second junction fitting 576, and ultimately to the parking brake 504.

Figure 10:
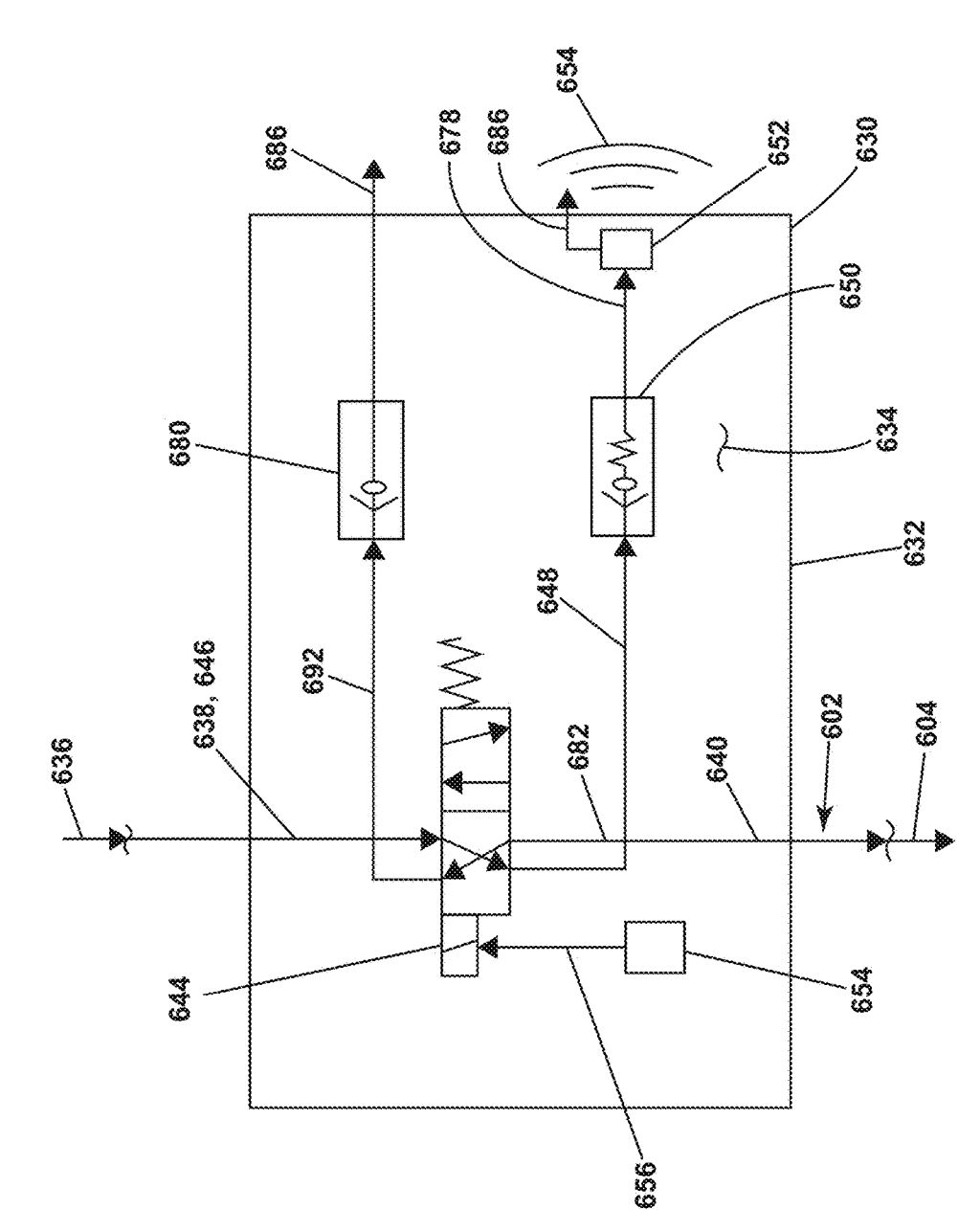
FIG. 10 is a schematic representation of a section of an exemplary OTR vehicle suitable for use as the OTR vehicle of FIG. 3, further illustrating a shore power connection alert system including a first check valve, a second check valve, and a solenoid valve in accordance with various aspects described herein.

FIG. 10 is a schematic representation of a section of an exemplary OTR vehicle 600 suitable for use as the OTR vehicle 100 of FIG. 3 The OTR vehicle 600 is similar to the OTR vehicle 100 (FIG. 0.3), 200 (FIG. 6), 300 (FIG. 7), 400 (FIG. 8), 500 (FIG. 9); therefore, like parts will be identified with like numerals increased to the 600 series with it being understood that the description of the OTR vehicle 100, 200, 300, 400, 500 applies to the OTR vehicle 600 unless noted otherwise.

The OTR vehicle 600 includes a parking brake system 602, and a shore power connection alert system 630 couplable to a respective portion of the parking brake system 602. The parking brake system 602 includes a compressed air input 636 and a parking brake 604.

The shore power connection alert system 630 can include a housing 632 defining an interior 634. The shore power connection alert system 630 includes a solenoid valve 644 having a fluid input line 646 and a first fluid output line 648. The fluid input line 646 is selectively fluidly couplable to the first fluid output line 648 based on the presence of a solenoid valve input 658 from a solenoid input source 656. The shore power connection alert system 630 includes a compressed air inlet line 638, a compressed air outlet line 640, a first check valve 650, a transmission unit 652, a first check valve 650, and a compressed air alert line 678. The transmission unit 652 is configured to generate an alert transmission 654.

The OTR vehicle 600 is illustrated schematically. It will be appreciated that only a section of the OTR vehicle 600 is shown. It will be appreciated that the OTR vehicle 600 includes any other suitable components described herein such as, but not limited to, a cargo area (e.g., the cargo area 112 of FIG. 3), a cab (e.g., the cab 120 of FIG. 3), a compressed air source (e.g., the compressed air source 106 of FIG. 3), or a combination thereof.

The shore power connection alert system 630 is similar to the shore power connection alert system 130 (FIG. 3), 230 (FIG. 6), 330 (FIG. 7), 430 (FIG. 8), 530 (FIG. 9), in that the transmission unit 652 is configured to produce the alert transmission 654 if the transmission unit 652 receives a flow of compressed air via the compressed air alert line 678. The solenoid valve 644, however, further includes a second fluid output line 682 and a third fluid output line 692. The second fluid output line is directly fluidly coupled to (e.g., formed with) the compressed air outlet line 640.

The shore power connection alert system 630, like the shore power alert system 130, 230, 330, 430, 530, includes an exhaust line 686. The exhaust line 686, however, is fluidly coupled to a portion of the shore power connection alert system that is separate from the transmission unit 652. Specifically, the exhaust line 686 is fluidly coupled to the third fluid output line 692. The shore power connection alert system 630 can include a second check valve 680 fluidly coupling the third fluid output line 692 to the exhaust line 686 to prevent backflow of fluid or contaminants from the exhaust line 686 and into the third fluid output line 692.

The exhaust line 686 exhausts a respective portion of the compressed air input 636 to a portion of the OTR vehicle 600 that is exterior the housing 632. Forming the exhaust line 686 separate from the transmission unit 652 allows for residual compressed air within the compressed air outlet line 640 to be exhausted exterior the parking brake system 602 if the shore power connection (e.g., the shore power connection 110 of FIG. 3) is connected to the OTR vehicle 600 prior to the engagement of the parking brake 604. As the shore power connection to the OTR vehicle 600 causes the solenoid to open, if the engagement of the parking brake 604 does not occur prior to the connection with the shore power connection, compressed air will be stuck within the parking brakesystem 602. The exhaust line 686 formed separate from the transmission unit 680 allows for a line to be opened for the residual compressed air to be exhausted from the parking brake system 602. This, in turn, causes the parking brake 604 to engage. Put another way, the shore power connection alert system 600 can automatically engage the parking brake 604 by exhausting the residual compressed air within the parking brake system 602 if the shore power connection is coupled to the OTR vehicle 600 prior to engaging the parking brake 604.

Figure 11:
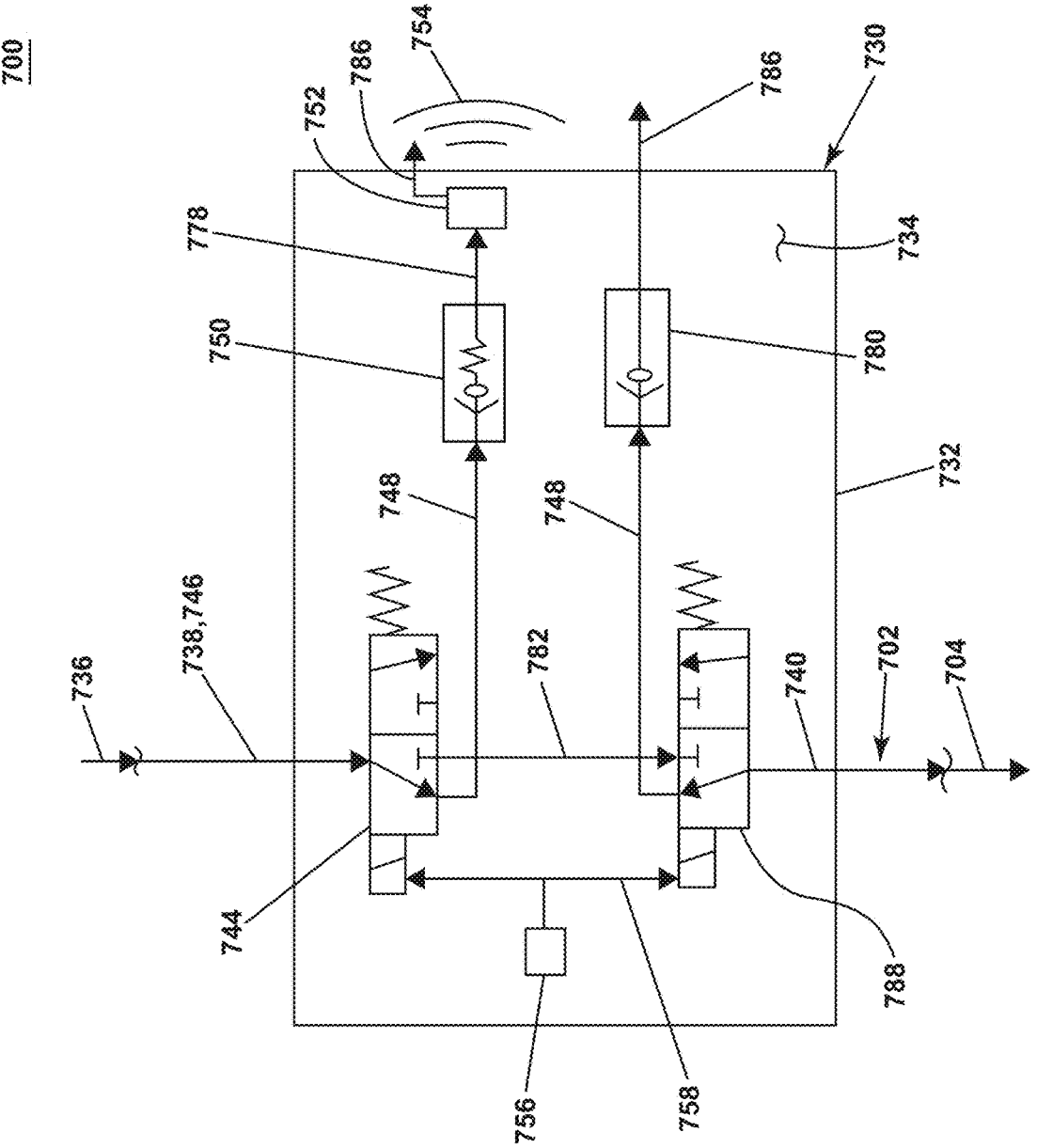
FIG. 11 is a schematic representation of a section of an exemplary OTR vehicle suitable for use as the OTR vehicle of FIG. 3, further illustrating a shore power connection alert system including a first check valve, a second check valve, a first solenoid valve and a second solenoid valve in accordance with various aspects described herein.

FIG. 11 is a schematic representation of a section of an exemplary OTR vehicle 700 suitable for use as the OTR vehicle 100 of FIG. 3 The OTR vehicle 700 is similar to the OTR vehicle 100 (FIG. 0.3), 200 (FIG. 6), 300 (FIG. 7), 400 (FIG. 8), 500 (FIG. 9), 600 (FIG. 10); therefore, like parts will be identified with like numerals increased to the 700 series with it being understood that the description of the OTR vehicle 100, 200, 300, 400, 500, 600 applies to the OTR vehicle 700 unless noted otherwise.

The OTR vehicle 700 includes a parking brake system 702, and a shore power connection alert system 730 couplable to a respective portion of the parking brake system 702. The parking brake system 702 includes a compressed air input 736 and a parking brake 704.

The shore power connection alert system 730 can include a housing 732 defining an interior 734. The shore power connection alert system 730 includes a first solenoid valve 744 having a fluid input line 746 and a first fluid output line 748. The fluid input line 746 is selectively fluidly couplable to the first fluid output line 748 based on the presence of a solenoid valve input 758 from a solenoid input source 756. The shore power connection alert system 730 includes a compressed air inlet line 738, a compressed air outlet line 740, a first check valve 750, a transmission unit 752, a first check valve 750, and a compressed air alert line 778. The transmission unit 752 is configured to generate an alert transmission 754.

The OTR vehicle 700 is illustrated schematically. It will be appreciated that only a section of the OTR vehicle 700 is shown. It will be appreciated that the OTR vehicle 700 includes any other suitable components described herein such as, but not limited to, a cargo area (e.g., the cargo area 112 of FIG. 3), a cab (e.g., the cab 120 of FIG. 3), a compressed air source (e.g., the compressed air source 106 of FIG. 3), or a combination thereof.

The shore power connection alert system 730 is similar to the shore power connection alert system 130 (FIG. 3), 230 (FIG. 6), 330 (FIG. 7), 430 (FIG. 8), 530 (FIG. 9), 630 (FIG. 10), in that the transmission unit 752 is configured to produce the alert transmission 754 if the transmission unit 752 receives a flow of compressed air via the compressed air alert line 778. Like the shore power connection alert system 630, the shore power connection alert system 730 includes an exhaust line 786 and a second check valve 780. The exhaust line 786 is separate from the transmission unit 752. The shore power connection alert system 730, however, includes a second solenoid valve 788. The first solenoid valve 744 and second solenoid valve 788 each include a respective fluid input line 746, a respective first fluid output line 748, and a respective second fluid output line 782.

The second fluid output line 782 of the first solenoid valve 744 extends between the first solenoid valve 744 and the second solenoid valve 788. The first fluid output line 748 of the first solenoid valve 744 extends between the first solenoid valve 744 and the first check valve 750. The first fluid output line 748 of the second solenoid valve 788 extends between the second solenoid valve 788 and the second check valve 780. The second fluid output 782 of the second solenoid valve 788 extends from the second solenoid valve 788 and to the compressed air outlet line 740. The solenoid valve input 758 is transmitted to each of the first solenoid valve 744 and the second solenoid valve 788.

Figure 12:
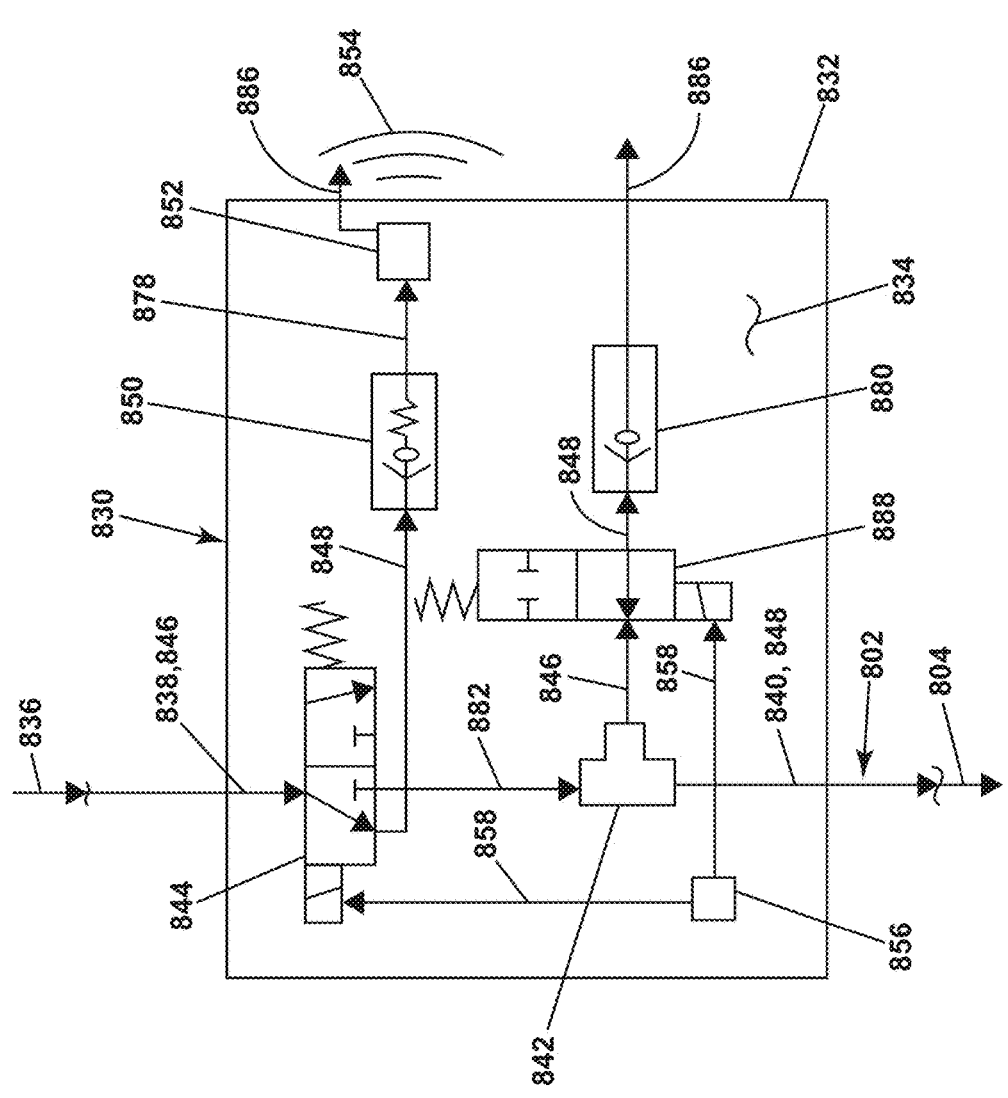
FIG. 12 is a schematic representation of a section of an exemplary OTR vehicle suitable for use as the OTR vehicle of FIG. 3, further illustrating a shore power connection alert system including a first check valve, a second check valve, a first solenoid valve, a second solenoid valve, and a junction fitting in accordance with various aspects described herein.

FIG. 12 is a schematic representation of a section of an exemplary OTR vehicle 800 suitable for use as the OTR vehicle 100 of FIG. 3 The OTR vehicle 800 is similar to the OTR vehicle 100 (FIG. 0.3), 200 (FIG. 6), 300 (FIG. 7), 400 (FIG. 8), 500 (FIG. 9), 600 (FIG. 10), 700 (FIG. 11); therefore, like parts will be identified with like numerals increased to the 800 series with it being understood that the description of the OTR vehicle 100, 200, 300, 400, 500, 600, 700 applies to the OTR vehicle 800 unless noted otherwise.

The OTR vehicle 800 includes a parking brake system 802, and a shore power connection alert system 830 couplable to a respective portion of the parking brake system 802. The parking brake system 802 includes a compressed air input 836 and a parking brake 804.

The shore power connection alert system 830 can include a housing 832 defining an interior 834. The shore power connection alert system 830 includes a first solenoid valve 844 having a fluid input line 846 and a first fluid output line 848. The fluid input line 846 is selectively fluidly couplable to the first fluid output line 848 based on the presence of a solenoid valve input 858 from a solenoid input source 856. The shore power connection alert system 830 includes a compressed air inlet line 838, a compressed air outlet line 840, a first check valve 850, a transmission unit 852, a first check valve 850, and a compressed air alert line 878. The transmission unit 852 is configured to generate an alert transmission 854.

The OTR vehicle 800 is illustrated schematically. It will be appreciated that only a section of the OTR vehicle 800 is shown. It will be appreciated that the OTR vehicle 800 includes any other suitable components described herein such as, but not limited to, a cargo area (e.g., the cargo area 112 of FIG. 3), a cab (e.g., the cab 120 of FIG. 3), a compressed air source (e.g., the compressed air source 106 of FIG. 3), or a combination thereof.

The shore power connection alert system 830 is similar to the shore power connection alert system 130 (FIG. 3), 230 (FIG. 6), 330 (FIG. 7), 430 (FIG. 8), 530 (FIG. 9), 630 (FIG. 10), 730 (FIG. 11), in that the transmission unit 852 is configured to produce the alert transmission 854 if the transmission unit 852 receives a flow of compressed air via the compressed air alert line 878. Like the shore power connection alert system 630, 730, the shore power connection alert system 830 includes an exhaust line 886 and a second check valve 880. The exhaust line 886 is separate from the transmission unit 852. The shore power connection alert system 830, like the shore power connection alert system 730, includes the first solenoid valve 844 and a second solenoid valve 888 with a respective fluid input line 846, and a respective first fluid output line 848. The first solenoid valve 844 includes a second fluid output line 882, while the second solenoid valve 888 does not.

The second fluid output line 882 of the first solenoid valve 844 extends between the first solenoid valve 844 and the junction fitting 842. The junction fitting 842 is provided at a junction between the second fluid output line 882 of the first solenoid valve 844, the fluid input line 846 of the second solenoid valve 888, and the compressed air outlet line 840. The first fluid output line 848 of the first solenoid valve 844 extends between the first solenoid valve 844 and the first check valve 850. The first fluid output line 848 of the second solenoid valve 888 extends between the second solenoid valve 888 and the second check valve 880. The solenoid valve input 858 is transmitted to each of the first solenoid valve 844 and the second solenoid valve 888.

Benefits of the present disclosure include an OTR vehicle outfitted with a shore power connection alert system. The shore power connection alert system, as described herein, is couplable to an existing architecture of an OTR vehicle (e.g., the parking brake system) and is configured to supply an alert if a flow of compressed air is fed through the parking brake system in an attempt to disengage the parking brake while the shore power connection is connected to the OTR vehicle. At least a portion of the compressed air meant to disengage the parking brake will flow into the compressed air alert line, causing the generation of an alert transmission. The generation of the alert transmission will alert the driver and those around the OTR vehicle that the shore power connection is still connected to the OTR vehicle. The shore power connection alert system will further at least partially prevent the compressed air from reaching the parking brake, thus stopping full disengagement of the parking brake. The alert transmission, along with stopping the full disengagement of the parking brake, in turn minimizes the possible damage to the OTR vehicle, damage to the loading dock, and the creation of a safety hazard. The shore power connection alert system is further retrofittable to existing architecture of the OTR vehicle. The retrofittable nature of the shore power connection alert system allows for all existing OTR vehicles to be outfitted with the shore power connection alert system if needed.

To the extent not already described, the different features and structures of the various aspects can be used in combination, or in substitution with each other as desired. That one feature is not illustrated in all of the examples is not meant to be construed that it cannot be so illustrated, but is done for brevity of description. Thus, the various features of the different aspects can be mixed and matched as desired to form new aspects, whether or not the new aspects are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A shore power connection alert system for an over-the-road (OTR) vehicle, the OTR vehicle comprising a cab, a cargo area, and a parking brake system having a parking brake and a compressed air source, the OTR vehicle being couplable to a shore power connection, the shore power connection alert system coupled to a respective portion of the OTR vehicle and comprising a first solenoid valve being actuatable through a solenoid input from a solenoid input source that originates from exterior the shore power connection alert system, the first solenoid valve including a fluid input line and a fluid output line, a compressed air inlet line fluidly couplable to the compressed air source and defining a fluid input line of compressed air from the compressed air source to the fluid input line, a compressed air outlet line fluidly couplable to the parking brake and defining a fluid output line of compressed air from a respective portion of the shore power connection alert system and to the parking brake, and a transmission unit fluidly coupled to the fluid output line, the transmission unit configured to produce an alert transmission by receiving a flow of compressed air from the compressed air source if the parking brakes are disengaged while the shore power connection is supplying a flow of power to a respective portion of the OTR vehicle.

A shore power connection alert system for an over-the-road (OTR) vehicle, the OTR vehicle comprising a cab, a cargo area, and a parking brake system having a parking brake and a compressed air source, the OTR vehicle being couplable to a shore power connection, the shore power connection alert system coupled to a respective portion of the OTR vehicle and comprising a first solenoid valve being actuatable through a solenoid input from a solenoid input source that originates from exterior the shore power connection alert system, the first solenoid valve including a fluid input line and a fluid output line, a compressed air inlet line fluidly couplable to the compressed air source and defining a fluid input line of compressed air from the compressed air source to the fluid input line, a compressed air outlet line fluidly couplable to the parking brake and defining a fluid output line of compressed air from a respective portion of the shore power connection alert system and to the parking brake, and an exhaust line fluidly coupled to the fluid output line, the exhaust line configured to exhaust a flow of compressed air from the compressed air source if an attempt to disengage the parking brake is made prior to disconnecting the OTR vehicle from the shore power connection. prevent disengagement of the A method of generating an alert transmission if a parking brake of an OTR vehicle is disengaged while the OTR vehicle is connected to a shore power connection, the alert transmission being generated through use of a shore power connection alert system coupled to the OTR vehicle, the method comprising providing a compressed air inlet line of the shore power connection alert system that is fluidly coupled to a compressed air source of the OTR vehicle, the compressed air inlet line defining a fluid input to the shore power connection alert system, providing a compressed air outlet line of the shore power connection alert system that is fluidly coupled to the parking brake, the compressed air outlet line defining a fluid output from the shore power connection alert system, and diverting, upon an attempted disengagement of the parking brake if the OTR vehicle is connected to the shore power connection, a flow of compressed air from the compressed air source through a solenoid valve and to a transmission unit configured to produce an alert transmission.

A method of retrofitting a shore power connection alert system to an OTR vehicle having a parking brake system with a parking brake and a compressed air source, the shore power connection alert system comprising a first solenoid valve being actuatable through a solenoid input from a solenoid input source that originates from exterior the shore power connection alert system, the first solenoid valve including a fluid input line and a fluid output line, a compressed air inlet line fluidly couplable to the compressed air source and defining a fluid input line of compressed air from the compressed air source to the fluid input line, and a compressed air outlet line fluidly couplable to the parking brake and defining a fluid output line of compressed air from a respective portion of the shore power connection alert system and to the parking brake, the method comprising fluidly coupling the compressed air inlet line to the parking brake system such that the compressed air inlet line is downstream of the compressed air source, and fluidly coupling the compressed air outlet line to the parking brake system such that the compressed air outlet line is upstream of the parking brake.

The shore power connection alert system of any preceding clause, wherein the shore power connection alert system is retrofittable to a respective portion of the OTR vehicle.

The shore power connection alert system of any preceding clause, wherein the shore power connection alert system comprises a housing defining an interior, with the first solenoid, the compressed air inlet line and the compressed air outlet line are provided within the interior.

The shore power connection alert system of any preceding clause, wherein the transmission unit is provided exterior the housing.

The shore power connection alert system of any preceding clause, wherein the alert transmission is at least one of an audible alarm, a wireless transmission, a visual transmission, or a combination thereof.

The shore power connection alert system of any preceding clause, wherein the transmission unit is a whistle.

The shore power connection alert system of any preceding clause, wherein the OTR vehicle further comprises a service brake system comprising a service brake fluidly couplable to the compressed air source, the shore power connection alert system further comprises a junction fitting fluidly coupling the fluid output line and compressed air source to the service brake, and the alert transmission is an engagement of the service brake.

The shore power connection alert system of any preceding clause, further comprising a check valve fluidly coupling the fluid output line to the transmission unit.

The shore power connection alert system of any preceding clause, further comprising a junction fitting fluidly coupling the compressed air inlet line to the solenoid input, and the compressed air outlet line.

The shore power connection alert system of any preceding clause, wherein the fluid input line is a first fluid input line, the fluid output line is a first fluid output line, the first solenoid valve further comprises a second fluid input line and a second fluid output line, and the shore power disconnect further comprises a junction fitting fluidly coupling the second fluid output line to the parking brake and the second fluid input line.

The shore power connection alert system of any preceding clause, further comprising a check valve fluidly coupling the junction fitting to the fluid input line of the second solenoid valve.

The shore power connection alert system of any preceding clause, further comprising the fluid output line is a first fluid output line, the first solenoid valve further comprises a second fluid output line, a first junction fitting fluidly coupling the second fluid output line to the compressed air outlet, and a second junction fitting fluidly coupling the compressed air inlet line and the first junction fitting to the fluid input line.

The shore power connection alert system of any preceding clause, wherein the compressed air inlet line forms the fluid input line.

The shore power connection alert system of any preceding clause, wherein the fluid output line is a first fluid output line, and the first solenoid valve further comprises a second fluid output line fluidly coupling the compressed air inlet to the compressed air outlet line.

The shore power connection alert system of any preceding clause, wherein the fluid output line is a first fluid output line, and the first solenoid valve comprises a second fluid output line and a third fluid output line, the second fluid output line fluidly coupled to an exhaust line of the shore power connection alert system, and the third fluid output line being couple to the compressed air outlet.

The shore power connection alert system of any preceding clause, further comprising a first check valve fluidly coupling the first fluid output line to a transmission unit configured to generate the alert transmission, and a second check valve fluidly coupling the second fluid output line to the exhaust line.

The shore power connection alert system of any preceding clause, wherein the exhaust line is configured to exhaust a flow of compressed air from within the parking brake system if the shore power connection is connected to the OTR vehicle prior to engagement of the parking brake.

The shore power connection alert system of any preceding clause, further comprising a second solenoid valve having a respective fluid input line and a respective fluid output line.

The shore power connection alert system of any preceding clause, wherein the fluid input line of the second solenoid valve is coupled to the fluid output line of the first solenoid valve.

The shore power connection alert system of any preceding clause, wherein the fluid outlet line of the second solenoid valve is fluidly coupled to the compressed air outlet line.

The shore power connection alert system of any preceding clause, wherein the shore power connection alert system is couplable to a front surface of the cargo area.

The shore power connection alert system of any preceding clause, wherein the OTR vehicle comprises a refrigeration unit, the refrigeration unit being electrically couplable to the first solenoid valve and defining the solenoid input when the refrigeration unit receives the supply of power from the shore power connection.

The shore power connection alert system of any preceding clause, wherein the refrigeration unit comprises a refrigeration power unit (RPU), with the shore power connection being used to prevent a continued use of the RPU during a loading procedure of the OTR vehicle.

The shore power connection alert system of any preceding clause, further comprising a transmission unit configured to transmit an alert transmission if a flow of compressed air is fed to the transmission unit.

The shore power connection alert system of any preceding clause, wherein the exhaust line is fluidly coupled to the transmission unit and the transmission unit is fluidly coupled to the fluid output line.

The shore power connection alert system of any preceding clause, wherein the fluid output line is a first fluid output line, and the first solenoid valve further comprises a second fluid output line, with the transmission unit being fluidly coupled to the second fluid output line.

The shore power connection alert system of any preceding clause, wherein the parking brake system comprises a glad-hand connection fluidly coupling the compressed air source to the compressed air inlet line.

The shore power connection alert system of any preceding clause, wherein the OTR vehicle is a semi-truck and the cargo area is defined by a trailer.

The shore power connection alert system of any preceding clause, wherein the OTR vehicle is a box truck.

The method of any preceding clause, wherein the alert transmission is a visual transmission.

The method of any preceding clause, wherein the alert transmission is an audible transmission.

The method of any preceding clause, wherein the alert transmission is a physical transmission.

The method of any preceding clause, wherein the alert transmission is an engagement of a service brake of the OTR vehicle.

What is claimed is:

1. A shore power connection alert system for an over-the-road (OTR) vehicle, the OTR vehicle comprising a cab, a cargo area, and a parking brake system having a parking brake and a compressed air source, the OTR vehicle being couplable to a shore power connection, the shore power connection alert system coupled to a respective portion of the OTR vehicle and comprising:

a first valve being actuatable through a input from an input source that originates from exterior the shore power connection alert system, the first valve including a fluid input line and a fluid output line;

a compressed air inlet line fluidly couplable to the compressed air source and defining a fluid input of compressed air from the compressed air source to the fluid input line;

a compressed air outlet line fluidly couplable to the parking brake and defining a fluid output of compressed air from a respective portion of the shore power connection alert system and to the parking brake; and a transmission unit fluidly coupled to the fluid output line, the transmission unit configured to produce an alert transmission by receiving a flow of compressed air from the compressed air source if the parking brake is disengaged while the shore power connection is supplying a flow of power to a respective portion of the OTR vehicle.

2. The shore power connection alert system of claim 1, wherein the first valve is a solenoid valve.

3. The shore power connection alert system of claim 1, wherein the shore power connection alert system is retrofittable to a respective portion of the OTR vehicle.

4. The shore power connection alert system of claim 3, wherein the shore power connection alert system comprises a housing defining an interior, with the first valve, the compressed air inlet line and the compressed air outlet line are provided within the interior.

5. The shore power connection alert system of claim 4, wherein the transmission unit is provided exterior the housing.

6. The shore power connection alert system of claim 1, wherein the alert transmission is at least one of an audible alarm, a wireless transmission, a visual transmission, or a combination thereof.

7. The shore power connection alert system of claim 6, wherein the transmission unit is a whistle.

8. The shore power connection alert system of claim 1, wherein:

the OTR vehicle further comprises a service brake system comprising a service brake fluidly couplable to the compressed air source;

the shore power connection alert system further comprises a junction fitting fluidly coupling the fluid output line and compressed air source to the service brake; and the alert transmission is an engagement of the service brake.

9. The shore power connection alert system of claim 1, further comprising a check valve fluidly coupling the fluid output line to the transmission unit.

10. The shore power connection alert system of claim 1, further comprising a junction fitting fluidly coupling the compressed air inlet line to a solenoid valve, and the compressed air outlet line.

11. The shore power connection alert system of claim 1, wherein:

the fluid input line is a first fluid input line;

the fluid output line is a first fluid output line;

a first solenoid valve further comprises a second fluid input line and a second fluid output line; and the shore power connection alert system further comprises a junction fitting fluidly coupling the second fluid output line to the parking brake and the second fluid input line.

12. The shore power connection alert system of claim 11, further comprising a check valve fluidly coupling the junction fitting to the fluid input line of a second solenoid valve.

13. The shore power connection alert system of claim 1, further comprising:

the fluid output line is a first fluid output line;

a first solenoid valve further comprising a second fluid output line;

a first junction fitting fluidly coupling the second fluid output line to the compressed air outlet line; and a second junction fitting fluidly coupling the compressed air inlet line and the first junction fitting to the fluid input line.

14. The shore power connection alert system of claim 1, wherein the compressed air inlet line forms the fluid input line.

15. The shore power connection alert system of claim 14, wherein the fluid output line is a first fluid output line, and a first solenoid valve comprising a second fluid output line formed with the compressed air outlet line.

16. The shore power connection alert system of claim 1, wherein:

the fluid output line is a first fluid output line; and a first solenoid valve comprises a second fluid output line and a third fluid output line, the second fluid output line fluidly coupled to an exhaust line of the shore power connection alert system, and the third fluid output formed with the compressed air outlet line.

17. The shore power connection alert system of claim 16, further comprising:

a first check valve fluidly coupling the first fluid output line to a transmission unit configured to generate the alert transmission; and a second check valve fluidly coupling the second fluid output line to the exhaust line.

18. The shore power connection alert system of claim 16, wherein the exhaust line is configured to exhaust a flow of compressed air from within the parking brake system if the shore power connection is connected to the OTR vehicle prior to engagement of the parking brake.

19. The shore power connection alert system of claim 18, further comprising a second solenoid valve having a respective fluid input line and a respective fluid output line.

20. The shore power connection alert system of claim 19, wherein the fluid input line of the second solenoid valve is coupled to the fluid output line of the first solenoid valve.

21. The shore power connection alert system of claim 20, wherein the fluid output line of the second solenoid valve is fluidly coupled to the compressed air outlet line.

22. The shore power connection alert system of claim 1, wherein the shore power connection alert system is couplable to a front surface of the cargo area.

23. The shore power connection alert system of claim 1, wherein the OTR vehicle comprises a refrigeration unit, the refrigeration unit being electrically couplable to a first solenoid valve and defining a solenoid input when the refrigeration unit receives a supply of power from the shore power connection.

24. The shore power connection alert system of claim 23, wherein the refrigeration unit comprises a refrigeration power unit (RPU), with the shore power connection being used to prevent a continued use of the RPU during a loading procedure of the OTR vehicle.

25. A shore power connection alert system for an over-the-road (OTR) vehicle, the OTR vehicle comprising a cab, a cargo area, and a parking brake system having a parking brake and a compressed air source, the OTR vehicle being couplable to a shore power connection, the shore power connection alert system coupled to a respective portion of the OTR vehicle and comprising:

a first valve being actuatable through an input from an input source that originates from exterior the shore power connection alert system, the first valve including a fluid input line and a fluid output line;

a compressed air inlet line fluidly couplable to the compressed air source and defining a fluid input of compressed air from the compressed air source to the fluid input line;

a compressed air outlet line fluidly couplable to the parking brake and defining a fluid output of compressed air from a respective portion of the shore power connection alert system and to the parking brake; and an exhaust line fluidly coupled to the fluid output line, the exhaust line configured to exhaust a flow of compressed air from the compressed air source if an attempt to disengage the parking brake is made prior to disconnecting the OTR vehicle from the shore power connection.

26. The shore power connection alert system of claim 25, further comprising a transmission unit configured to transmit an alert transmission if a flow of compressed air is fed to the transmission unit.

27. The shore power connection alert system of claim 26, wherein the exhaust line is fluidly coupled to the transmission unit and the transmission unit is fluidly coupled to the fluid output line.

28. The shore power connection alert system of claim 26, wherein the fluid output line is a first fluid output line, and the first valve further comprises a second fluid output line, with the transmission unit being fluidly coupled to the second fluid output line.

29. The shore power connection alert system of claim 25, wherein the parking brake system comprises a gladhand connection fluidly coupling the compressed air source to the compressed air inlet line.

30. The shore power connection alert system of claim 26, wherein the OTR vehicle is a semi-truck and the cargo area is defined by a trailer.

31. The shore power connection alert system of claim 25, wherein the OTR vehicle is a box truck.

32. A method of generating an alert transmission if a parking brake of an over-the-road (OTR) vehicle is disengaged while the OTR vehicle is connected to a shore power connection, the alert transmission being generated through use of a shore power connection alert system coupled to the OTR vehicle, the method comprising:

providing a compressed air inlet line of the shore power connection alert system that is fluidly coupled to a compressed air source of the OTR vehicle, the compressed air inlet line defining a fluid input to the shore power connection alert system;

providing a compressed air outlet line of the shore power connection alert system that is fluidly coupled to the parking brake, the compressed air outlet line defining a fluid output from the shore power connection alert system; and diverting, upon an attempted disengagement of the parking brake if the OTR vehicle is connected to the shore power connection, a flow of compressed air from the compressed air source through a solenoid valve and to a transmission unit configured to produce an alert transmission.

33. The method of claim 32, wherein the alert transmission is a visual transmission.

34. The method of claim 32, wherein the alert transmission is an audible transmission.

35. The method of claim 32, wherein the alert transmission is a physical transmission.

36. The method of claim 32, wherein the alert transmission is an engagement of a service brake of the OTR vehicle.

37. A method of retrofitting a shore power connection alert system to an over-the-road (OTR) vehicle having a parking brake system with a parking brake and a compressed air source, the method comprising:

a first valve being actuatable through a input from a input source that originates from exterior the shore power connection alert system, the first valve including a fluid input line and a fluid output line;

a compressed air inlet line fluidly couplable to the compressed air source and defining a fluid input of compressed air from the compressed air source to the fluid input line; and a compressed air outlet line fluidly couplable to the parking brake and defining a fluid output of compressed air from a respective portion of the shore power connection alert system and to the parking brake;

the method comprising;

fluidly coupling the compressed air inlet line to the parking brake system such that the compressed air inlet line is downstream of the compressed air source; and fluidly coupling the compressed air outlet line to the parking brake system such that the compressed air outlet line is upstream of the parking brake.

38. The method of claim 37, wherein the first valve is a solenoid valve.

\* \* \* \* \*